US005989378A

United States Patent [19]

[11] Patent Number: 5,989,378

[45] Date of Patent: Nov. 23, 1999

Liu et al.

[54] INK JET RECORDING MATERIAL AND PRODUCING PROCESS THEREOF

[75] Inventors: Bo Liu; Hiroyuki Nemoto, both of Chiba; Hideo Ikezawa, Tokyo, all of Japan

[73] Assignee: New Oji Paper Co., Ltd., Tokyo, Japan

[21] Appl. No.: 08/700,999

[22] Filed: Aug. 21, 1996

[30] Foreign Application Priority Data

| | | | |
|---|---|---|---|
| Aug. 21, 1995 | [JP] | Japan | 7-212105 |
| Oct. 27, 1995 | [JP] | Japan | 7-279985 |
| Nov. 30, 1995 | [JP] | Japan | 7-311909 |
| Dec. 28, 1995 | [JP] | Japan | 7-343833 |
| Dec. 28, 1995 | [JP] | Japan | 7-343835 |

[51] Int. Cl.$^6$ .......... B44C 1/165; B32B 31/00; B32B 5/16; B32B 9/06

[52] U.S. Cl. .......... 156/241; 156/230; 156/231; 156/239; 156/242; 156/247; 156/248; 156/249; 428/327; 428/342; 428/452; 346/135.1; 427/366; 427/391

[58] Field of Search .......... 156/247, 248, 156/249, 230, 239, 242, 241, 231; 428/327, 452, 342; 346/135.1; 427/366, 391

[56] References Cited

U.S. PATENT DOCUMENTS

| | | | |
|---|---|---|---|
| 4,440,827 | 4/1984 | Miyamoto et al. | 428/327 |
| 5,647,935 | 7/1997 | Hoshino et al. | 156/231 |

FOREIGN PATENT DOCUMENTS

| | | |
|---|---|---|
| 0 655 346 A1 | 5/1995 | European Pat. Off. . |
| 3151471 | 8/1982 | Germany . |

OTHER PUBLICATIONS

Patent Abstracts of Japan, vol. 17, No. 361 (C–1080), Jul. 8, 1993 & JP–A–05 051470 (Toray Industries, Incorporated), Mar. 2, 1993.

*Primary Examiner*—Jeffrey Stucker
*Assistant Examiner*—Brett Nelson
*Attorney, Agent, or Firm*—Wenderoth, Lind & Ponack L.L.P.

[57] ABSTRACT

An ink jet recording material is constituted by a support and a recording layer on the support, in which a plurality of recording layer may be provided. At least one recording layer contains colloidal particles and a water-soluble resin. In order to produce the ink jet recording material, a sticking or adhesive interlayer is provided on a support, and a recording layer including at least one layer is superposed on the interlayer. At least one of the at least one layer of the recording layer contains colloidal particles and a water-soluble resin, and the recording layer is coated and formed on a forming material. Then, the forming material is peeled from said recording layer.

13 Claims, 2 Drawing Sheets

INK JET RECORDING MATERIAL AND PRODUCING PROCESS THEREOF

BACKGROUND OF THE INVENTION

1. Field of the Invention

The present invention relates to an ink jet recording material and a process for producing the ink jet recording material and more particularly to an ink jet recording material having an gloss, a high excellent ink absorption and an excellent moisture and water resistibility.

2. Description of the Related Art

In an ink jet recording process, ink droplets which are injected through a nozzle at a high speed are attached to a recording material to effect recording. This type of recording is advantageous in that it can easily operate with a full color system and gives a low printing noise. The ink to be used in this recording process has a large content of a solvent. In order to obtain a high recording density, it is necessary to use a large amount of an ink. Further, since ink droplets are continuously injected, an ink droplet is injected before the preceding droplet is absorbed by the recording material, causing these ink droplets to be fused to each other to give fused ink dots. Accordingly, the ink jet recording material must have a high ink absorption volume as well as a high ink absorption rate.

Referring to the ink jet recording material of coated paper type, there is provided a porous pigment as a recording layer. In this arrangement, the color and sharpness governing the image quality are controlled to enhance the color reproducibility or image reproducibility. In order to cope with the rapid spread of ink jet printers, printed matters having a gloss as high as photograph are called for in uses such as publication and wrapping in the art of printing. In particular, in the case of color recording, from the standpoint of dot shape, dot sharpness, ink absorption, fixing rate and ink absorption volume, a film having a recording layer or a coated paper type of recording material is in great demand.

If the foregoing porous pigment is used, the pores formed by the pigment must be large because it is necessary that the ink be absorbed by the recording material. Accordingly, the pigment particles must be large. However, if the pigment particles are large, the desired surface smoothness of the recording layer cannot be obtained. Further, the light transmission is hindered, rendering the recording layer opaque. As a result, a high gloss cannot be obtained.

In general, in order to obtain an ink jet recording material having a high gloss, it is necessary that the transparency and smoothness of the recording layer be raised.

Referring to a support having a water-impermeable layer such as film and laminated paper, there is an attempt to obtain an ink jet recording material having a high gloss by the method described below or the like. For example, a system has been proposed in which a porous recording layer is formed on a transparent support such that an image formed on the recording layer can be observed from the support side (as disclosed in JP-A-61-197285 (The term "JP-A" as used herein means an "Unexamined Japanese Patent Publication (kokai)")). However, such a system is disadvantageous in that image processing must be effected such that mirror image is printed. Further, such a system is disadvantageous in that the support to be used is limited to a transparent material. Further, ink jet recording materials including a transparent and glossy support coated with a transparent resin which absorbs an ink upon dissolution and swelling are commercially available. However, these ink jet recording materials which absorb an ink by the dissolution and swelling of such a resin are disadvantageous in that it has a low ink drying rate and a high hydrophilicity and thus can be easily dissolved in water and exhibits a poor water resistance.

A recording material has recently been proposed comprising two or more layers wherein the upper layer is a gloss-developing layer. For example, in JP-A-7-101142, the preparation of an ink jet recording material having a high gloss is attempted by the lamination of a gloss-developing layer containing a pigment having an average particle diameter of not more than 300 nm dispersed therein as a main component. However, this proposal is disadvantageous in that the gloss-developing layer can easily sink in the recording layer. Thus, even if the surface of the recording material is smoothened by calendering, a highly smooth surface cannot be obtained due to the effect of roughness given by the pigment in the recording layer besides the surface roughness developed by coating. Further, an excellent gloss cannot be obtained. Further, in this application, in order to obtain a desired ink absorption rate, a high molecular latex is used as an adhesive (binder) to be incorporated in the gloss-developing layer. As a result, the coating layer is cracked, and the cracks thus obtained provides some ink absorption rate. However, the resulting ink dot has a notched circumference. Thus, the dot is far from circular. Further, dots are fused to each other, making it impossible to provide prints having a high fineness.

A process for the preparation of an ink jet recording material which comprises enhancement of surface smoothness, i.e., pressing the recording layer against a heated mirror-like roll while a gloss-developing layer containing a colloidal silica or colloidal silica composite incorporated therein as a main component is wet, and then drying the material is proposed (JP-A-7-117335). This process is known as a process for allowing a film-forming substance such as adhesive to trace the surface of the mirror-like drum in the cast coater as disclosed in U.S. Pat. No. 5,272,846.

The cast-coated paper obtained according to the foregoing process is disadvantageous in that the resulting coating layer loses porosity due to the presence of the film-forming substance and hence exhibits a reduced ink absorption during ink jet recording. In JP-A-7-117335, as the adhesive there is used a high molecular latex. In this arrangement, the coating layer undergoes drastic cracking on the order of micron meter to have ink absorption. However, since the gloss-developing layer can be cracked similarly to the above mentioned case, prints having a high fineness cannot be obtained. Further, since it is necessary that water vapor or the like pass through the coating layer and paper during drying, pinholes can be easily formed, making it impossible to obtain an ink jet recording material having excellent gloss, smoothness and luster as high as photograph.

Further, since the casted paper is inherently pressed against the cast drum during drying, the coated paper must have an air permeability (to allow the passage of water vapor during drying). In other words, a film-based (including laminated paper) cast-coated sheet is difficult to be prepared.

In addition, various methods have been attempted to obtain an ink jet recording material having a high gloss. Examples of these attempts include a process which comprises laminating the recorded surface after ink jet recording to attain a high gloss as disclosed in JP-A-61-230973, JP-A-61-230974, JP-A-61-230975, and JP-A-61-230976. However, lamination after printing has a problem of mechanical facility and high cost and thus cannot be normally applied.

Further, as disclosed in JP-A-63-151476, a process is proposed for obtaining an ink jet recording sheet having a desired surface which comprises applying a coating mainly composed of a pigment and a binder to a support to form a coating layer, semi-drying the coating layer, superposing a transferring sheet having a desired surface condition (including high surface smoothness) on the surface of the coating layer, drying the laminate, and then peeling the transferring sheet off the surface of the coating layer to obtain a characteristic surface condition (including high surface smoothness). However, in this transferring process, a film or a transferring sheet having a desired surface condition is pressed against a coating layer which is in semi-dried state. Thus, the control over the drying condition is extremely difficult. Further, when the transferring sheet is laminated on the coating layer, air bubbles or the like can be easily contained in the coating layer, making it impossible to obtain a high smoothness. In this process, lamination is effected during drying similarly to casting method. Thus, the support and/or transferring sheet must be permeable to air. However, pinholes can be easily formed in the coating layer similarly to casted paper. Accordingly, an ink jet recording material having a gloss and smoothness as high as photograph can hardly be obtained.

Referring to an ink jet recording material having a high gloss, a system is proposed in which an image formed on a porous recording layer formed on a transparent support is observed from the support side (JP-A-61-197285). However, such a system is disadvantageous in that image processing must be effected such that mirror image is printed. Further, such a system is disadvantageous in that the support to be used is limited to a transparent material.

On the other hand, in order to control the color and sharpness governing image quality in the coated paper type of recording material, a recording layer (consisting of a single layer or a plurality of layers) containing a porous pigment incorporated therein is provided in an attempt to enhance the color reproducibility or image reproducibility. For example, as disclosed in JP-A-63-13776 and JP-A-63-104878, an ink jet recording material is proposed having a recording layer containing primary or secondary porous particles as pigment particles and a binder incorporated therein.

Further, a process is proposed for providing an ink jet recording material having a higher image quality which comprises forming pores in the uppermost layer of the recording layer in such an arrangement that pore diameters have peaks in the range of from 0.2 to 10 $\mu$m to raise the ink absorption rate, whereby an ink absorbed by the recording layer is taken in by voids having a pore diameter of not more than 0.05 $\mu$m, for the purpose of enhancing the print quality, as disclosed in JP-B-63-22997 (The term "JP-B" as used herein means an "examined Japanese patent publication"). It is necessary that the size of pigment particles themselves or secondary particles be raised to render the foregoing layer porous. However, if the size of pigment particles is increased, the surface of the recording layer cannot be provided with smoothness. Further, the light transmission is hindered, rendering the recording layer opaque. Thus, a color recording having a high gloss which is as beautiful as photograph cannot be obtained.

As ink jet recording materials having a pigment-containing layer there have been reported many ink jet recording papers having a recording layer formed by a pigment such as silica, alumina, pseudo-boehmite, calcium carbonate and kaolin and a water-soluble high molecular compound such as starch and polyvinyl alcohol cellulose derivative as an adhesive. Such a recording layer has an excellent water resistance but normally has no smoothness and gloss. For example, as disclosed in JP-B-61-60793 and JP-A-2-274587, a synthetic silica, a colloidal silica, and a water-soluble high molecular adhesive are used to form such a recording layer. However, in order to keep the desired ink absorption, the incorporation of a synthetic silica having a relatively large particle diameter is indispensable. A synthetic silica normally has a large particle diameter. Thus, the desired smoothness and gloss can hardly be obtained.

Further, in order to provide a recording layer on various substrates, EP-0648611A1 discloses an ink jet recording material obtained by a process which comprises forming a recording layer on a release material, forming an adhesive layer on the recording layer, laminating the obtained material on various substrates, and then peeling a release material off the laminate to obtain a laminate of recording layer, adhesive layer and substrate. In this case where an adhesive layer is provided on a recording layer, in the case where the recording layer contains a pigment and thus absorbs an ink by the porosity, when an adhesive layer is applied to the recording layer, the adhesive penetrates through the pores, causing the drastic reduction of ink absorption rate of the recording layer. Further, since the recording layer is porous, numeral air bubbles are formed in the adhesive layer, eliminating the smoothness of the recording layer and hence impairing the external appearance. If the recording layer is not porous, an ink is absorbed by the swelling of the recording layer. Thus, the ink absorption rate is reduced. Further, the surface smoothness is eliminated by swelling. Moreover, since the resulting coat layer has no water resistance, a satisfactory ink jet recording material cannot be obtained.

SUMMARY OF THE INVENTION

It is an object of the present invention to provide an ink jet recording material which exhibits a high gloss, an excellent ink absorption, an excellent moisture and an excellent water resistance, and can provide color recording in the quality as a photograph.

An ink jet recording material according to the present invention is comprised of a support and a recording layer on the support, in which a plurality of recording layer may be provided. At least one recording layer contains colloidal particles and a water-soluble resin.

Preferably, such an ink jet recording material is produced in the following manner. A sticking or adhesive interlayer is provided on a support; and a recording layer including at least one layer formed on a forming material is superposed on the interlayer. At least one of the layers of the recording layer contains colloidal particles and a water-soluble resin, and the recording layer is coated and formed on a forming material. Then, the forming material is peeled from said recording layer.

The ink jet recording material according to the present invention has a high gloss as well as a high colorability, high preservability against high humidity, high adaptability to ink jet recording (printing), high print density and water resistance.

DETAILED DESCRIPTION OF THE PREFERRED EMBODIMENTS

Figure 1A:
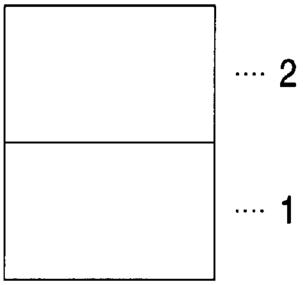
FIGS. 1A to 1D are sectional views illustrating an embodiment of a producing process of an ink jet recording material according to the present invention.

An embodiment I of the ink jet recording material according to the present invention wherein at least the uppermost layer of said recording layers containing a dispersion of primary colloidal particles and a water-soluble resin incorporated therein and at least one of peaks on the pore distribution curve of said uppermost layer lies in the pore diameter of from 2 nm to 100 nm will be first described.

Before the present invention, coated paper type ink jet recording sheets have been roughly divided into the following two types:

(1) Ordinary lusterless ink jet coated paper

Such a type of coated paper has an ink-receiving layer containing as main components secondary particles of silica, alumina or the like incorporated therein. The pore diameter distribution curve of the ink-receiving layer has peaks lying in the radius of 0.05 μm and in the radius of from 0.2 μm to 10 μm as described in JP-B-63-22997. However, since the ink-receiving layer using secondary particles (agglomerates) has a porous surface that scatters light, it is impossible to obtain an image having good photographic properties such as excellent gloss, luster and transparency.

(2) Glossy ink jet coated paper

Such a type of coated paper has an ink-receiving layer normally made of a resin such as polyvinyl alcohol. The resin swells to absorb an ink. However, this type of a coated paper has great disadvantages in that it lacks gloss or is inferior in water resistance. Such an ink-receiving layer exhibits a pore diameter distribution curve having peaks lying in the range of less than 2 nm.

The inventors attempted to prepare such an ink-receiving layer containing particles as the main components. However, the ink absorption and gloss could hardly be balanced.

Thus, extensive studies have been made in the present invention. For example, the amount of an adhesive to be incorporated in the primary colloidal particles (ex. colloidal silica) which is then formed into a film was reduced to prevent the gap between the colloidal particles from being blocked by the adhesive. By properly controlling the size of the gap, i.e., designing such that at least one of peaks on the pore diameter distribution curve lies in the range of from 2 nm to 100 nm, an ink jet recording material which exhibits a high gloss and meets requirements for both ink absorption and water resistance was obtained.

In the embodiment I, an ink jet recording material containing an ink-receiving layer formed on a sheet support such as paper and film, the ink-receiving layer consists of one or more layers wherein at least the uppermost layer of the layers constituting the ink-receiving layer is one containing colloidal silica and the uppermost and second layers of the layers constituting the ink-receiving layer exhibit a pore diameter distribution curve having peaks at least one of which lies in the range of from 2 nm to 100 nm.

In further embodiment I, dot is controlled to obtain an excellent image. In other words, the ink-receiving layer consists of two or more layers wherein at least the uppermost layer and the second layer of the layers constituting the ink-receiving layer form a laminate containing colloidal silica and the uppermost and second layers of the layers constituting the ink-receiving layer exhibit a pore diameter distribution curve having peaks at least one of which lies in the range of from 2 nm to 100 nm.

In this arrangement, a high gloss ink jet recording material can be obtained which exhibits a high ink absorption rate, provides a high print density and shows good water resistance, ink-fixability and printability.

When at least one of peaks on the pore diameter distribution curve of the uppermost layer of the layers constituting the ink-receiving layer lies in the range of from 2 nm to 100 nm, preferably from 5 nm to 80 nm, an increased ink absorption rate is provided. In order to obtain pores which fall within this range of diameters, a layer containing a colloidal silica having a particle diameter of from 10 nm to 300 nm and an adhesive may be formed. A coating layer having pore diameters falling within this range exhibits an excellent smoothness and transparency. If the peak in the pore diameter distribution lies in a value falling below this range, the resulting ink absorption rate is reduced. On the contrary, if the peak in the pore diameter distribution lies in a value exceeding this range, not fine dots can be obtained. Further, the resulting ink-receiving layer has some surface roughness that impairs the smoothness thereof.

Moreover, when the ink-receiving layer consists of two or more layers wherein at least two of the layers constituting the ink-receiving layer contain a colloidal silica incorporated therein and the uppermost layers and the second layer of the layers constituting the ink-receiving layer exhibit a pore diameter distribution curve having peaks at least one of which lies substantially in the range of from 2 nm to 100 nm, the ink which has been left unabsorbed by the uppermost layer (particularly on the area on which colors are overlapped) is absorbed by the second layer. Further, since the second layer, has pores falling within the range of from 2 nm to 100 nm, it can prevent dots from expanding. Thus, highly fine print dots having a higher density and a high luster can be obtained.

This can not only enhance the smoothness and transparency throughout the ink-absorbing layer but also provide color recording of beautiful photographic tone.

Moreover, when the ink-receiving layer of the ink jet recording material of the present invention is made of a colloidal silica and a water-soluble high molecular adhesive, the resulting ink-receiving layer has excellent transparency and ink absorption.

When the coated amount of the colloidal silica-containing layer is in a proportion of from 50% to 100% based on the entire ink-receiving layer, the printed area can be provided with transparency, making it possible to obtain gloss as high as photograph.

Further, when a cation-modified colloidal silica is used as a colloidal silica, an ink jet recording material excellent in both ink-fixability and preservability against moisture can be obtained.

Moreover, when an ink-receiving layer of the embodiment I which has been applied to the forming material is transferred to the support via a sticking or adhesive interlayer, the resulting gloss can be remarkably enhanced, providing an ink jet recording material with a higher smoothness and gloss.

It was also found that when the peak on the pore diameter distribution curve of the uppermost layer lies only in the range of from 2 nm to 100 nm, it can not only minimize the expansion of dot printed but also control the shape of dot printed to almost circle. Thus, an ink jet recording material with a higher gloss, a higher fineness and a better luster can be obtained.

Similarly in the case where the ink-receiving layer consists of two or more layers, when the peak on the pore diameter distribution curve of the various layers lies only in the range of from 2 nm to 100 nm, it can not only control dot printed to almost circle but also cause the ink to be rapidly absorbed on the densely printed area. Thus, a high gloss ink jet recording material which can provide a nearly ideal image as fine as photograph can be obtained.

Incidentally, the colloid particle is used as the primary colloidal particles of the embodiment I, but the collide particles described later can be used.

The measurement of pore diameter distribution will be described hereinafter.

In the present invention, in order to minimize the effect of the support, the ink-receiving layer was formed on a polyester film (Lumirror T, available from Toray Industries, Inc.; 75 μm) to give a specimen to be measured.

For the measurement of pore diameter distribution, Poresizer 9320 (available from Shimadzu Corp.) was used. The pore diameter distribution (differential curve) can be obtained from a void distribution curve determined by mercury intrusion method. In the measurement of pore diameter by mercury intrusion method, the pore diameter was calculated by the following equation derived on the assumption that the section of pore is circular:

$$D=-4\gamma \cos\theta/P$$

wherein D is a pore diameter, γ is a surface tension of mercury, θ is a contact angle, and P is a pressure.

The surface tension of mercury was set to 484.536 dyn/cm. The contact angle used was 130°. Under these conditions, mercury pressure was measured at a low pressure portion (0 to 30 psia; pore diameter to be measured: 360 μm to 6 μm) and a high pressure portion (30 to 30,000 psia; pore diameter to be measured: 6 μm to 6 nm). The average pore volume of the ink-receiving layer is calculated from the weight of the ink-receiving layer previously measured and the void distribution curve. In the present invention, once the pore diameter distribution curve of the various layers containing primary colloidal particles has shown peaks lying in the range of from 6 nm to 100 nm, the measurement is finished.

If there were recognized no peaks in the range of from 6 nm to 100 nm, ASAP 2010 (high speed specific surface area/pore diameter distribution measuring instrument available from Shimadzu Corp.; gas absorption method by constant volume method), which can measure pore diameters of from 1 nm to 100 nm, was used to continue measurement.

In the present invention, as the support there may be used a film such as cellophane, polyethylene, polypropylene, soft polyvinyl chloride, hard polyvinyl chloride or polyester, paper such as wood free paper, art paper, coated paper, cast-coated paper, foil paper, kraft paper, polyethylene-laminated paper, impregnated paper, metallized paper or water-soluble paper or sheet such as metal foil and synthetic paper.

The ink-receiving layer of the present invention will be further described hereinafter.

Firstly, the primary colloidal particles containing layer constituting the ink-receiving layer of the present invention will be described.

As the primary colloidal silica particles described later can be used, but the colloidal silica which is the dispersion body of the primary particle is preferably used. The explanation will be made as the colloidal silica is an example, but this can be applied to other pigments.

As the colloidal silica to be incorporated in the uppermost layer or second layer there may be properly selected from the group consisting of commercially available anionic colloidal silica and cationic colloidal silica. Cationic colloidal silica can be advantageously incorporated in the uppermost or second layer to provide a practically good preservability against moisture.

If anionic colloidal silica is used, an acidic anion colloidal silica is preferred. The use of such an acidic anion colloidal silica can provide an ink-receiving layer with a higher transparency. The reason for this mechanism is unknown but is probably because an alkaline colloidal silica (most commercial colloidal silica is alkaline) normally contains sodium oxide that can affect the refractive index and hence adversely affect the transparency of the resulting ink-receiving layer.

The average particle diameter of primary colloidal particle of the colloidal silica used is adjusted to a range of from 10 nm to 300 nm, preferably from 20 nm to 200 nm. (For the measurement of average particle diameter, BET method is used to measure the surface area of particles from which the average particle diameter is calculated. The average particle diameter is hereinafter measured by this method unless otherwise defined.) Of course, a blend of two or more kinds of colloidal silica may be used as necessary. If colloidal silica having a particle diameter of less than 10 nm is used, the peak on the pore diameter distribution curve can lie in the range of less than 2 nm, possibly making it impossible to obtain the desired ink absorption rate. On the contrary, if colloidal silica having a particle diameter of more than 300 nm is used, the peak on the pore diameter distribution curve can lie in the range of more than 100 nm, causing the loss of transparency. Thus, there is a possibility that an ink jet recording which can exhibit a high gloss after printing cannot be obtained. When colloidal silica having an average particle diameter of from 20 nm to 200 nm is used, an ink-receiving layer having a pore diameter distribution showing peaks at least one of which lies in the range of from 5 nm to 80 nm can be often obtained. If the pore diameters in the ink-receiving layer has peaks lying in this range, there is no problems with ink absorption rate even when a high speed printing is effected. Further, the resulting smoothness, transparency and luster are close to that of photograph.

In general, colloidal silica is not film-forming itself. Therefore, when colloidal silica is provided as an ink-receiving layer, an adhesive is incorporated in the ink-receiving layer. As the adhesive (binder) there may be properly used a conventional known water-soluble resin adhesive (binder) commonly used in coated paper such as polyvinyl alcohol, modified polyvinyl alcohol such as silanol modified polyvinyl alcohol and cation modified polyvinyl alcohol, casein, soybean protein, synthetic protein, starch and cellulose derivative (e.g., carboxymethyl cellulose, methyl cellulose). Further, a small amount of a high molecular latex may be added if desired.

In order to obtain an ink-receiving layer having a pore diameter distribution and a high luster according to the present invention, the dispersibility of colloidal silica with the adhesive must be good. In other words, it is necessary that even if an adhesive is added, colloidal silica undergoes little or no agglomeration in the dispersion and stays dispersed in the form of primary particles. If the colloidal silica is agglomerated, the resulting coating layer has a surface roughness, and the peak on the pore diameter distribution curve thereof lies in the range of more than 100 nm. Thus, the smoothness of the ink-receiving layer can be drastically reduced, not to mention the transparency thereof. From the standpoint of dispersibility with colloidal silica, a water-soluble high. molecular adhesive is preferred. In particular, polyvinyl alcohol (hereinafter referred to as "PVA") or modified polyvinyl alcohol is most useful.

The weight ratio of colloidal silica to adhesive by solid content is preferably from 4/1 to 50/1, more preferably from 20/3 to 20/1. If the added amount of the adhesive exceeds the above defined range, the height of the peak on the pore diameter distribution curve is reduced. At the same time, the average pore volume of the resulting ink-receiving layer can fall below 0.1 ml/g. Thus, the ink absorption rate is reduced, possibly leaving the ink unabsorbed on the high density area. On the contrary, if the added amount of the adhesive falls below the above defined range, the ink-receiving layer can be drastically cracked on the entire surface thereof, impairing the transparency thereof.

Of course, besides the primary colloidal particles such as colloidal silica and the adhesive (binder), other pigments may be added.

For example, various common pigments known in the art of ordinary coated paper can be properly used. Examples of such a pigment include amorphous silica, kaolin, clay, calcined clay, zinc oxide, tin oxide, magnesium sulfate, aluminum oxide, aluminum hydroxide, calcium carbonate, satin white, aluminum silicate, smectite, zeolite, magnesium silicate, magnesium carbonate, magnesium oxide, diatomaceous earth, styrenic plastic pigment, urea resin plastic pigment, and benzoguanamine plastic pigment. However, in order to keep the desired smoothness and transparency of the coated layer, the amount of the other pigments to be used is adjusted to not more than 20% based on the weight of primary colloidal particles. The average particle diameter of the pigments to be additionally used is preferably not more than 2 $\mu$m.

A cationic resin may be incorporated in the ink-receiving layer of the present invention. In this arrangement, the ink-receiving layer can exhibit an enhanced ink-fixability.

Examples of the cationic resin include polyalkylene polyamine such as polyethylene amine and polypropylene polyamine, derivative thereof, acrylic resin having tertiary amino group or quaternary ammonium group, and diacrylamine. The amount of the cationic resin to be added is preferably adjusted to a range of from 1 to 30 parts by weight, more preferably from 5 to 20 parts by weight based on 100 parts by weight of pigment. Besides the cationic resin, various auxiliaries such as dispersant, thickening agent, anti-foaming agent, coloring agent, antistatic agent and preservative may be properly added.

The coated amount of the ink-receiving layer is not specifically limited but is preferably adjusted to a range of from 1 to 80 g/m$^2$, more preferably from 4 to 40 g/m$^2$. If the coated amount falls below the above defined range, the resulting coating film can be cracked. On the contrary, if the coated amount exceeds the above defined range, the resulting effect is uselessly saturated. In order to attain an amount of coating as high as not less than 15 g/m$^2$, the viscosity or concentration of the coating solution can be raised. Alternatively, a batchwise application of the coating solution may be effected to attain such a high amount of coating.

The layer containing colloidal silica has been described. If both the uppermost layer and second layer consist of layers containing colloidal silica, it is preferred that the particle diameter of colloidal silica in the second layer be greater than that of colloidal silica in the uppermost layer from the standpoint of ink absorption rate and print density. The ink-receiving layer may consist of only a colloidal silica layer (which may, of course, consist of three or more colloidal silica-containing layers). However, in general, colloidal silica has no pores itself. Therefore, the resulting ink-receiving layer has an extremely small void between particles. In order to cause the ink to be thoroughly absorbed by the colloidal silica layer on the high recording density area, it is necessary that the coated amount be raised. If the coated amount of the colloidal silica layer is not raised, other ink-receiving layers may be provided to obtain an ink jet recording sheet according to the present invention having a high ink absorption rate, a high gloss, a high printability and a high water resistance which can provide a high print density.

In order to keep desired gloss and luster after printing, it is preferred that the coated amount of the layer containing colloidal silica be adjusted to a range of from 50% to 100% based on the entire ink-receiving layer. If this proportion falls below the above defined range, the resulting print can hardly be provided with gloss and luster as high as photograph, though being provided with a predetermined gloss.

The other ink-receiving layers provided under the primary colloidal particles-containing layer will be further described.

As the pigment to be incorporated in the other ink-receiving layers there may be properly used any common pigment known in the art of ordinary coated paper such as amorphous silica, clay, alumina and smectite. From the standpoint of print density, etc., silica such as amorphous silica and alumina are preferred. As the adhesive (binder) there may be used any of those described above. Examples of such an adhesive include compounds which have heretofore been known in the art, such as PVA, casein, starch and SBR latex.

The added amount of the adhesive is adjusted to a range of from 5 to 150 parts by weight, preferably from 10 to 50 parts by weight based on 100 parts by weight of the pigment used. As the cationic resin to be used for the purpose of enhancing the ink-fixability there may be used any of the cationic resins described above. Examples of such a cationic resin include amine resins.

The added amount of the cationic resin is preferably adjusted to a range of from 1 to 30 parts by weight, more preferably from 5 to 20 parts by weight based on 100 parts by weight of the pigment used. Besides these components, various auxiliaries for use in the production of ordinary coated paper such as dispersant, thickening agent, anti-foaming agent, coloring agent, antistatic agent and preservative may be properly added.

The coated amount of the other ink-receiving layers is not specifically limited but is preferably adjusted to a range of from 3 to 30 g/m$^2$. If the added amount of the other ink-receiving layers falls below this range, the resulting ink absorption is insufficient. On the contrary, if the added amount of the other ink-receiving layers exceeds this range, the resulting effect is uselessly saturated.

As the coater for obtaining any of these ink-receiving layers there may be used any known coating apparatus such as blade coater, air knife coater, roll coater, bar coater, gravure coater, rod blade coater, lip coater and curtain coater.

The ink-receiving layer can be formed on the support by a coating apparatus. Alternatively, the ink-receiving layer can be formed by a process which comprises forming an ink-receiving layer on a forming material, forming an adhesive or sticking interlayer on a support, bonding the interlayer to the ink-receiving layer, and then peeling only the forming material off the laminate. The ink-receiving layer thus formed by making the best use of the forming material has a higher gloss.

An embodiment II of an ink jet recording sheet containing a laminate of support, interlayer and recording layer obtained by a process which comprises coating the forming material with recording layer or layers at least one of which contains colloidal particles and a water-soluble resin incorporated therein, forming a sticking or adhesive interlayer on a support, superposing the recording layers on the interlayer, and then peeling the forming material off the laminate will be described hereinafter.

As shown in FIG. 1A, a coating solution containing a pigment and an adhesive is applied to a forming material 1 having a high surface smoothness (e.g., film, laminated paper, glassine paper, glass), and then dried to form a film as a recording layer 2.

Figure 1B:
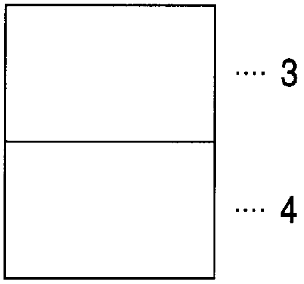
Figure 1C:
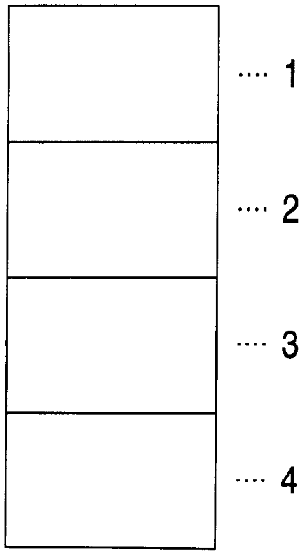

As shown in FIG. 1B, an interlayer 3 (high molecular resin) is applied to a support 4. Subsequently, as shown in FIG. 1C, the interlayer 3 is bonded to the foregoing recording layer 2. As the bonding method, laminate method is most effective. If the interlayer 3 is a pressure-sensitive adhesive, it may be applied to the support 4, dried, and then bonded to the foregoing recording layer 2 to obtain a laminate shown in FIG. 1C.

Figure 1D:
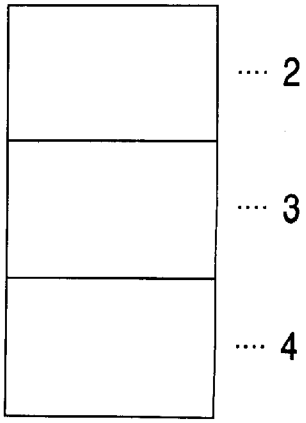

Further, the forming material 1 may then be peeled off the laminate to obtain a high gloss ink jet recording sheet according to the present invention as shown in FIG. 1D.

An embodiment of the recording layer consisting of two layers, i.e., upper layer and lower layer will be described in connection with FIG. 2.

Figure 2A:
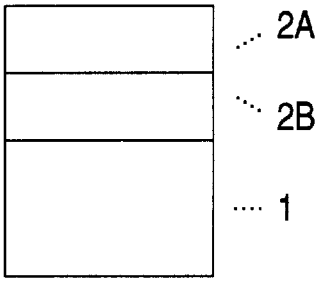
FIGS. 2A to 2D are sectional views illustrating another embodiment of a producing process of an ink jet recording material according to the present invention.

As shown in FIG. 2A, a coating solution containing colloidal particles (like colloidal silica) and a water-soluble resin is applied to a forming material 1 having a high surface smoothness to form a film as an upper recording layer 2B. Subsequently, a coating solution containing a pigment and an adhesive or a water-soluble resin solution is applied to the upper recording layer 2B, and then dried to form a film as a lower recording layer 2A. Thus, a recording layer consisting of two layers is obtained.

Figure 2B:
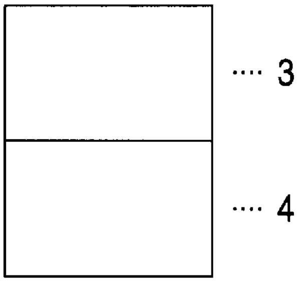
Figure 2C:
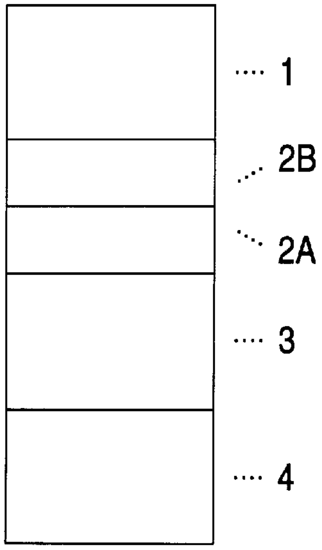

Subsequently, as shown in FIG. 2B, a sticking or adhesive interlayer 3 (high molecular resin) is applied to a support 4. As shown in FIG. 2C, the interlayer 3 is then bonded to the lower recording layer 2A. As the bonding method, laminate method is most effective. If the interlayer 3 is a pressure-sensitive adhesive, it may be applied to the support 4, dried, and then bonded to the lower recording layer 2A to obtain a laminate shown in FIG. 2C.

Figure 2D:
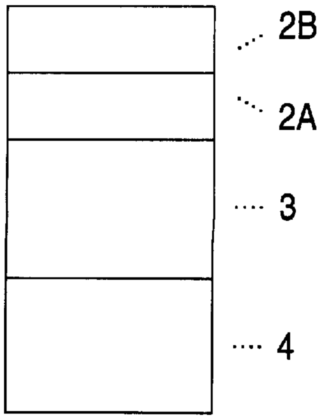

Further, the forming material 1 may then be peeled off the laminate to obtain a high gloss ink jet recording sheet according to the present invention as shown in FIG. 2D.

The forming material may be coated with a silicone resin, fluororesin or the like to facilitate peeling.

Further, silica may be incorporated in the recording layer to facilitate peeling.

Basically, in the embodiment II, an ink jet recording sheet has a support, an interlayer and a recording layer which are superposed in sequence. A recording layer coating solution is applied to a forming material to form a film as a recording layer which is then transferred to a support via an interlayer. The forming material is then peeled off the laminate to obtain an ink jet recording sheet of the present invention.

The ink jet recording sheet of the present invention has a high surface gloss and an excellent adaptability to ink jet recording (printing) at the same time.

As the bonding method for use in transferring the recording layer to the support via the interlayer, laminate method (e.g., dry laminate method, wet laminate method, hot melt laminate method, extrusion laminate method) is useful.

In wet laminate method, dry laminate method or hot melt laminate method, an adhesive resin or an adhesive is applied to a support to form an interlayer which is then contact-bonded to a laminate of forming material and recording layer in such an arrangement that the interlayer and the recording layer are faced to each other. The forming material is then peeled off the laminate to obtain the desired ink jet recording sheet. In extrusion laminate method, a polyethylene which has been heat-melted at a temperature of from 280° C. to 320° C. in a melt extruder (other thermoplastic resins may be similarly processed) is casted over a support. The support laminate is then bonded to a forming material having a recording layer formed thereon. The laminate is then subjected to contact bonding by a cooling roll. The forming material is then peeled off the laminate to obtain the desired ink jet recording sheet.

If a pressure-sensitive adhesive is used as an interlayer, it may be applied to a support by means of a bar coater, roll coater, lip coater or the like, and then dried to form a film which is then bonded to a recording layer. The forming material is then peeled off the laminate to obtain the desired ink jet recording sheet.

The coated amount of the interlayer is not specifically limited so far as it allows the recording layer and the support to be bonded to each other. Even if any of thermoplastic resin, adhesive and pressure-sensitive adhesive is used, the coated amount of the interlayer is adjusted to a range of from 2 to 50 $g/m^2$. If the coated amount of the interlayer falls below this range, a sufficient adhesivity can hardly be obtained. On the contrary, if the coated amount of the interlayer exceeds this range, the resulting effect is uselessly saturated.

As the high molecular resin to be incorporated in the interlayer there may be properly used a thermoplastic resin (e.g., ethylcellulose, vinyl acetate resin, derivative thereof, polyethylene, ethylene-vinyl acetate copolymer, polyvinyl alcohol acrylic resin, polystyrene, copolymer thereof, polyisobutylene, hydrocarbon resin, polypropylene, polyamide resin, polyester resin), adhesive (e.g., thermosetting resin such as urea resin, phenol resin, epoxy resin and polyisocyanate resin, composite polymer type adhesive such as polyvinyl acetal/phenol resin, rubber/phenol resin and epoxy/nylon resin, rubber adhesive such as latex type rubber, hydrophilic natural high molecular adhesive such as starch, glue and casein), pressure-sensitive adhesive (e.g., solvent type pressure-sensitive adhesive, emulsion type pressure-sensitive adhesive, hot melt type pressure-sensitive adhesive, or heat sensitive adhesive).

As the support there may be properly used a film made of cellophane, polyethylene, polypropylene, soft polyvinyl chloride, hard polyvinyl chloride, polyester or the like, paper such as wood free paper, art paper, coated paper, cast-coated paper, foil paper, kraft paper, polyethylene-laminated paper, impregnated paper, metallized paper and water-soluble paper or sheet such as metal foil and synthetic paper.

As the forming material there may be properly used a film having a high surface smoothness made of cellophane, polyethylene, polypropylene, soft polyvinyl chloride, hard polyvinyl chloride, polyester or the like, paper such as polyethylene-laminated paper, glassine paper, impregnated paper and metallized paper, sheet such as metal foil and synthetic paper, plate having a high surface smoothness made of inorganic glass, metal, plastic or the like, metal drum or the like. In particular, from the standpoint of coatability and peelability between the forming material and the recording layer, a high molecular film (e.g., polyethylene, polypropylene, polyester), polyethylene-laminated paper, glassine paper, inorganic glass or the like is preferred.

Such a forming material can be used untreated. In order to enhance the peelability between the forming material and the recording layer, the forming material may be coated with a peelable resin such as silicone and fluororesin on the coating surface thereof. The coating surface of the forming material is coated with such a peelable resin in an amount of from 0.05 to 3 $g/m^2$ to obtain a forming material having a good peelability. If the coated amount of the peelable resin falls below this range, a desired effect by surface treatment can hardly be exerted. If the coated amount of the peelable resin exceeds this range, the resulting effect is uselessly saturated. Further, in order to enhance printability, the forming material can be advantageously subjected to hydrophilic treatment by corona discharge or plasma treatment. The surface roughness Ra of the forming material is normally not more than 1 $\mu$m, preferably not more than 0.5 $\mu$m, more preferably not more than 0.1 $\mu$m, most preferably not more than 0.05 $\mu$m.

The recording layer of the present invention will be further described hereinafter.

Firstly, if the recording layer consists of a single layer (see FIG. 1D), it contains a pigment and an adhesive (binder) incorporated therein.

As the pigment there may be preferably used silica (amorphous silica, colloidal silica). Other examples of pigments which can be properly used herein include various common pigments known in the art of ordinary coated paper such as kaolin, clay, calcined clay, zinc oxide, tin oxide, magnesium sulfate, aluminum oxide, aluminum hydroxide, calcium carbonate, satin white, aluminum silicate, smectite, zeolite, magnesium silicate, magnesium carbonate, magnesium oxide, diatomaceous earth, styrene plastic pigment, urea resin plastic pigment, benzoguanamine plastic pigment, lithopone, hydrated halloysite, alumina sol and pseudo-boehmite. Two or more of these pigments may be used in combination.

The content of the pigment such as silica is preferably from 10% to 95% by weight. If the content of the pigment falls below this range, the layer can occasionally be hardly peeled off the forming material. On the contrary, if the content of the pigment exceeds this range, the film-forming properties of the recording layer can be deteriorated. The reason why the incorporation of silica or the like makes it easy to peel the laminate at the surface of the forming material is unknown but is probably because the incorporation of silica or the like weakens the adhesivity between the recording layer and the forming material.

In order to obtain a high gloss, the average particle diameter of the pigment such as silica is preferably from 0.01 to 5 $\mu$m. If the average particle diameter of the pigment falls below this range, the resulting recording layer exhibits a deteriorated permeability to ink. On the contrary, if the average particle diameter of the pigment exceeds this range, the recording layer thus formed can be observed to have a surface roughness that makes it difficult to obtain a high gloss. In order to control the average of silica, particularly amorphous silica, to the desired level, an aqueous dispersion of silica may be ground by means of a ball mill.

As the adhesive (binder) there may be used a water-soluble resin such as casein, soybean protein, synthetic protein, starch, polyvinyl alcohol, modified polyvinyl alcohol such as silanol modified polyvinyl alcohol or cation modified polyvinyl alcohol and cellulose derivative (e.g., carboxymethyl cellulose, methyl cellulose). Further, conjugated diene polymer latex such as methyl methacrylate-butadiene copolymer or vinyl polymer latex such as styrene-butadiene co-polymer, acrylic polymer latex and ethylene-vinyl acetate copolymer added in combination. These known adhesives (binders) may be used singly or in combination. The added amount of the adhesive is preferably controlled to a range of from 2% to 50% by weight, more preferably from 5% to 25% by weight based on the weight of the pigment used.

The cationic resin may be incorporated in the recording layer. The incorporation of the cationic resin provides an enhancement of dye fixability or print color density. Examples of the cationic resin include polyalkylene polyamine such as polyethylene amine and polypropylene polyamine, derivative thereof, acrylic resin having tertiary amino group or quaternary ammonium group, and diacrylamine. The added amount of the cationic resin is preferably controlled to a range of from 1 to 30 parts by weight, more preferably from 5 to 20 parts by weight based on 100 parts by weight of the pigment used. Besides the cationic resin, various auxiliaries to be used in the production of ordinary coated paper, such as dispersant, thickening agent, anti-foaming agent, coloring agent, antistatic agent and preservative may be properly incorporated in the recording layer.

The coated amount of the recording layer is controlled to a range of from 5 to 50 $g/m^2$. If the coated amount of the recording layer falls below this range, the ink is partly left unabsorbed on the area requiring a high density. On the contrary, if the coated amount of the recording layer exceeds this range, the resulting effect is uselessly saturated. In order to attain an amount of coating as high as not less than 15 $g/m^2$, the viscosity or concentration of the coating solution can be raised. Alternatively, a batchwise application of the coating solution may be effected to attain such a high amount of coating.

The embodiment II of the present invention wherein the recording layer consists of two layers, i.e., lower layer (interlayer side) and upper layer will be described hereinafter (see FIG. 2D). The surface of the upper layer obtained by peeling the forming material has a high smoothness and a white paper-like gloss as high as the single-layer recording layer. Further, the surface of the upper layer can reflect light to exhibit a better print gloss than the single-layer recording layer.

The lower recording layer may be made of the same composition as used in the foregoing single-layer recording layer (ink-receiving layer).

In the case of the two-layer recording layer, the forming material is not peeled off the laminate at the lower layer. Therefore, the lower layer does not need to contain silica or the like incorporated therein. Further, since the upper layer is present, the lower layer may be made of only a hydrophilic resin having a relatively low water resistance (e.g., polyvinyl alcohol, cellulose derivative, casein, gelatin).

The upper layer is made of, e.g., a layer containing colloidal particles such as colloidal silica particles.

As the colloidal particles, it is most preferable that the average particle diameter is less than 200 $\mu$m as described in embodiment III.

In this arrangement, the recording layer can be easily peeled off the forming material. The average particle diameter of the pigment such as silica to be incorporated is preferably from 0.01 to 5 $\mu$m, more preferably from 0.05 to 2 $\mu$m.

In the case where a single-layer recording layer is provided, the average particle diameter of amorphous silica, colloidal silica or the like is preferably from 0.01 to 5 $\mu$m.

The coated amount of the upper layer is from about 1 to 10 $\mu$m. If the coated amount of the upper layer falls below this range, the resulting effect of the upper layer is not sufficient. On the contrary, if the coated amount of the upper layer exceeds this range, it takes much time for the ink to permeate therethrough, reducing the ink absorption rate. The coated amount of the under layer is from about 5 to 50 $g/m^2$.

The water content of the recording layer to be transferred to the support via the interlayer is preferably controlled to a range of not more than 20%, more preferably not more than 10%. The reason for this definition is unknown but is probably because if the water content of the recording layer exceeds 20%, the adhesivity between the forming material and the recording layer is stronger than that between the layers constituting the recording layer, causing the layers constituting the recording layer to be peeled off each other when the forming material is peeled off the laminate and hence leaving the recording layer on the forming material and making it impossible to obtain a desired ink jet recording sheet.

Examples of the coater for providing the recording layer include various known coating apparatus such as blade coater, air knife coater, roll coater, bar coater, gravure coater, rod blade coater, lip coater and curtain coater.

The embodiment III of the ink jet recording sheet of the present invention obtained by a process which comprises superposing a recording layer having a coating film formed on a forming material on a support via an interlayer, and then peeling the forming material off said recording layer wherein the recording layer contains at least a lower layer (layer close to interlayer or support) and an upper layer (layer far from interlayer or support), the upper layer contains a pigment in an amount of not less than 80% by weight based on the solid content of the upper layer and the pigment contains colloidal particles having an average particle diameter of not more than 200 nm in a proportion of not less than 85% by weight of the pigment will be described hereinafter.

As the bonding method for transferring the recording layer to the support via the sticking or adhesive interlayer there may be used the foregoing bonding method such as laminate method (e.g., dry laminate method, wet laminate method, hot melt laminate method, extrusion laminate method).

The recording layer according to the present embodiment will be described.

Referring first to the upper layer, since the ink is fixed in the lower layer, the upper layer preferably has an enhanced transparency to obtain a desired print density. In order to obtain a transparent upper layer, it is preferred that the pigment used contains colloidal particles in a proportion of not less than 85% by weight of the pigment, more preferably not less than 90% by weight of the pigment and the average particle diameter of the colloidal particles is controlled to a range of not more than 200 nm, more preferably from 20 nm to 150 nm. (For the measurement of the average particle diameter of colloidal particles, the surface area of colloidal particles is determined by BET method. The average particle diameter is then calculated from the surface area thus determined. For the measurement of the average particle diameter of colloidal particles having an average particle diameter of not more than 1 $\mu$m, BET method is used hereinafter unless otherwise defined. For the measurement of the average particle diameter of colloidal particles having an average particle diameter falling outside this range, sedimentation method is used to measure the particle size distribution thereof from which the average particle diameter is then calculated.) If the average particle diameter of colloidal particles exceeds 200 nm, it suddenly loses transparency, giving a lowered print density. Further, if the colloidal particles contain particles having an average particle diameter of not less than 200 nm incorporated therein, the resulting upper layer disadvantageously exhibits a deteriorated transparency.

As the colloidal particles employable herein there may be used colloidal particles which can provide a colloidal solution (solution containing particles which are so fine as not to undergo precipitation even after hours of standing). The size of the colloidal particles is not specifically limited but is normally from 1 nm to 200 nm. The presence of the colloidal particles can be recognized by ultramicroscope or electron microscope. However, some particles having an average particle diameter of not more than about 500 nm can be colloidal. As one of characteristics of colloidal solution there is known Tyndall effect.

The upper layer contains a pigment such as dispersion of colloidal particles and an adhesive (binder) incorporated therein. In order to keep the desired ink absorption rate, the total content of the pigment is controlled to a range of not less than 80% by weight, preferably not less than 85% by weight. Further, in order to give a sufficient adhesivity, the upper limit of the total content of the pigment is more preferably controlled to 98% by weight, most preferably 97% by weight.

Examples of the pigment which can serve as colloidal particles include various pigments known in the art of ordinary coated paper such as colloidal silica, amorphous silica, kaolin, clay, calcined clay, zinc oxide, tin oxide, magnesium sulfate, aluminum oxide, aluminum hydroxide, calcium carbonate, satin white, aluminum silicate, smectite, zeolite, magnesium silicate, magnesium carbonate, magnesium oxide, diatomaceous earth, styrene plastic pigment, urea resin plastic pigment and benzoguanamine plastic pigment. The colloid to be used in the present invention is a uniform dispersion of primary or secondary particles of the foregoing pigment. Secondary particles having a large particle diameter were subjected to dispersion by ball mill dispersion method, sandmill dispersion method, ultrasonic dispersion method or the like before use. Among the foregoing pigments, amorphous silica having a small primary particle diameter may be subjected to wet crushing, ball mill dispersion or sandmill dispersion under properly controlled conditions to obtain colloidal particles. In particular, the dispersion can be advantageously diluted to a concentration of about 5%. These colloidal particles may be used singly or in combination.

The foregoing colloidal particles may be anionic, cationic or nonionic but is not specifically limited so far as the effect of the upper layer necessary in the present invention can be exerted. In general, the dye to be incorporated in the ink is anionic. Therefore, in order to leave the ink unfixed in the upper layer and keep the desired gloss after printing, preference of colloidal particles to be incorporated in the upper layer is anionic colloidal particles, nonionic colloidal particles, and cationic colloidal particles in this order. In particular, if anionic colloidal particles having an electrical repulsion against the dye in the ink are used, the dye is little fixed in the upper layer after printing, making it easier to obtain a high gloss.

In the present invention, the gloss, transparency and ink permeability of the upper layer are particularly requested. Thus, as the pigment to be incorporated in the upper layer, colloidal silica is most useful. This is because the refractive index of colloidal silica is in the vicinity of 1.45, making it relatively easy to obtain a high gloss. In general, a colloidal silica is an anionic colloidal dispersion obtained by dispersing stably ultrafine particles of silicic anhydride (silica) in water. Such an anionic colloidal dispersion is commercially available in the trade name of Ludox from Du Pont or Snowtex from Nissan Chemical Industries, Ltd.

Such an anionic colloidal silica can be produced by various preparation processes. In general, a method using an ion-exchanging resin is used. In some detail, an aqueous solution of sodium silicate is passed through a cation-exchanging resin to make a sol having $SiO_2/Na_2O$ of from 60 to 130. The sol is then heated and ripened at a temperature of not lower than 60° C. to grow to independently dispersed particles. To the particles is then added a sol which has been passed through an ion-exchanging resin layer to cause polymerization and precipitation, thereby allowing the growth of particles to an average particle diameter of from 3 to 300 nm. Thus, a stable sol is obtained. The silica sol thus obtained has a siloxane structure and normally has a negative charge ($OH^-$) strong enough to cause silica particles to repel each other.

The cationic colloidal silica can be obtained by a process which comprises causing a cation group such as quaternary ammonium ion or a cationic compound to be adsorbed by the surface of silica to modify at least the surface of silica such that it has a cationic charge.

As the colloidal particles such as colloidal silica to be incorporated in the upper layer there may be preferably used anionic colloidal particles. In this arrangement, the ink passes through the upper layer and is then fixed in the lower layer, making it easy to obtain a recording material having an extremely good print gloss. However, if the upper layer is anionic, the ink is not fixed in the upper layer. Thus, if the ink absorption rate is low, the ink flows over the surface of the upper layer, causing ink stain. Accordingly, in this arrangement, the ink absorption rate of the upper layer is preferably improved by increasing the pigment content as described below or by other methods.

In order to obtain a desired ink absorption rate, the pigment content in the upper layer is controlled to not less than 80% by weight, preferably not less than 85% by weight. In this manner, a sufficient ink absorption rate can be obtained without blocking the void between pigment particles by a binder. Further, problems such as ink stain can be solved. Thus, a high gloss and a good printability can be provided.

Further, by controlling the pigment content to not less than 80% by weight, better ink absorption properties can be obtain even if nonionic or cationic colloidal particles are used.

Pigments other than colloidal particles can be additionally used. Examples of such pigments include those having a particle diameter of more than 0.5 $\mu$m among those exemplified as pigments which can serve as colloidal particles.

As the adhesive (binder) to be incorporated in the upper layer there may be used water-soluble resin adhesives (binders) such as casein, soybean protein, synthetic protein, starches, polyvinyl alcohol, modified polyvinyl alcohol such as silanol modified polyvinyl alcohol or cation modified polyvinyl alcohol and cellulose derivative (e.g., carboxymethyl cellulose, methyl cellulose), singly or in combination. Further, a high molecular latex such as SBR may be additionally used so far as the effect of the present invention is not impaired. The added amount of the adhesive is controlled to a range of not more than 25 parts by weight, preferably not more than 17.5 parts by weight based on 100 parts by weight of the pigment used, provided that the lower limit of the added amount of the adhesive is preferably 2 parts by weight, most preferably 3 parts by weight to provide the upper layer with a sufficient adhesivity.

Further, various auxiliaries to be incorporated in the coating layer of ordinary ink jet recording sheet, such as cationic resin, dispersant, thickening agent, anti-foaming agent, coloring agent, antistatic agent and preservative may be properly incorporated in the upper layer so far as the print gloss of the upper layer is not impaired.

The coated amount of the upper layer is not specifically limited but is preferably adjusted to a range of from 1 to 20 $\mu$m to obtain desired transparency and ink absorption. If the coated amount of the upper layer falls below 1 $\mu$m, the coating solution can be easily repelled during coating. On the contrary, if the coated amount of the upper layer exceeds 20 $\mu$m, the ink absorption rate can be disadvantageously affected.

The lower layer (layer close to the interlayer or the support) will be described hereinafter.

As the pigment to be incorporated in the lower layer there may be used a pigment as exemplified with reference to the embodiment shown in FIG. 1D wherein the recording layer consists of a single layer.

The particle diameter of the pigment to be incorporated in the lower layer is preferably greater than that of the pigment to be incorporated in the upper layer. In this arrangement, the average pore diameter of voids formed between the pigment particles in the lower layer is greater than that in the upper layer. Thus, the ink which has passed through the upper layer can be rapidly absorbed by the lower layer, making it possible to obtain a clearer image. The particle diameter of the lower layer is preferably greater than that of the upper layer. In order to obtain a sheet having a higher smoothness and a higher gloss, as the pigment particles to be incorporated in the lower layer there may be preferably used colloidal particles having a particle diameter of not more than 500 nm. From the standpoint of ink-fixability and surface smoothness, as the pigment to be incorporated in the lower layer there may be most effectively used cationic colloidal particles, particularly cationic colloidal silica. The use of the cationic colloidal silica is advantageous in that it not only raises the ink absorption and fixing rate but also makes it easy to obtain a high gloss as compared with other pigments.

As the adhesive (binder) to be incorporated in the lower layer there may be used a known adhesive (binder) to be normally incorporated in coated paper such as watersoluble resin like casein, soybean protein, synthetic protein, starches, polyvinyl alcohol, modified polyvinyl alcohol such as silanol modified polyvinyl alcohol or cation modified polyvinyl alcohol and cellulose derivative (e.g., carboxymethyl cellulose, methyl cellulose) and water soluble resin like vinyl polymer latex (e.g., styrene-butadiene copolymer, conjugated diene polymer latex of methyl methacrylate-butadiene copolymer, acryl polymer latex, ethylene-vinyl acetate copolymer), singly or in combination. Especially, water soluble resin is preferable. The added amount of the adhesive is controlled to a range of from 1 to 150 parts by weight, preferably from 5 to 50 parts by weight based on 100 parts by weight of the pigment in the lower layer.

Further, the recording layer may contain a cation resin incorporated therein to enhance the ink-fixability thereof. As the cation resin, the above described cation resin can be used. Further, various auxiliaries to be used in the production of ordinary coated paper, such as dispersant, thickening agent, anti-foaming agent, coloring agent, antistatic agent and preservative may be properly incorporated in the recording layer.

The coated amount of the lower layer is not specifically limited but is preferably adjusted to a range of from 5 to 70 $g/m^2$ to cause the ink to be thoroughly absorbed on a high density area. If the coated amount of the lower layer falls below this range, the ink absorption disadvantageously runs short. On the contrary, if the coated amount of the lower layer exceeds this range, the resulting effect is uselessly saturated. In order to attain an amount of coating as high as not less than 15 $g/m^2$, the viscosity or concentration of the coating solution can be raised. Alternatively, a batchwise application of the coating solution may be effected to attain such a high amount of coating.

Examples of the coating apparatus for obtaining any recording layer include various known coating apparatus such as blade coater, air knife coater, roll coater, bar coater, gravure coater, rod blade coater, lip coater and curtain coater.

Another embodiment of the ink jet recording material wherein two or more ink-receiving layers containing colloidal silica and an adhesive incorporated therein are formed on a support will be described hereinafter. In this embodiment, the forming material may or may not be used to form the recording layer.

The lower (nearer to the support) layer containing colloidal silica and an adhesive incorporated therein (hereinafter abbreviated as "lower layer") in the embodiment of the ink jet recording material wherein the ink-receiving layer consists of at least two layers containing colloidal silica and an adhesive incorporated therein will be described.

The lower layer of the present invention contains colloidal silica and an adhesive incorporated therein. The average particle diameter of the colloidal silica to be incorporated in the lower layer is adjusted to a range of from 20 nm to 300 nm, preferably from 30 nm to 250 nm. Of course, two or more colloidal silica may be used in combination if desired. The colloidal silica employable herein may be anionic or cationic. Cationic colloidal silica can be advantageously incorporated in the lower layer taking into account the practicality such as preservability against moisture.

As the adhesive (used as a binder) there may be preferably used a water-soluble resin such as polyvinyl alcohol, modified polyvinyl alcohol such as silanol modified polyvinyl alcohol or cation modified poly vinyl alcohol, casein, soybean protein, synthetic protein, starches and cellulose derivative (e.g., carboxymethyl cellulose, methyl cellulose). Latexes such as styrene-butadiene copolymer, conjugated diene polymer latex of methyl methacrylate-butadiene copolymer, acrylic polymer latex and vinyl polymer latex (e.g., ethylene-vinyl acetate copolymer) may be additionally used so far as the effect of the present invention is not impaired.

From the standpoint of dispersibility with colloidal silica, a polyvinyl alcohol and modified polyvinyl alcohol (hereinafter referred to as "PVA") is most useful.

PVA having a percent saponification of not less than 95% and a polymerization degree of not more than 1,100 or a silicon-containing modified PVA (silanol modified polyvinyl alcohol or the like) having a polymerization degree of not more than 1,100 can be used to obtain a uniform colloidal silica/PVA dispersed coating solution. Such a coating solution can be applied to obtain a glossy ink-receiving layer having a relatively good transparency.

The weight ratio of the colloidal silica to the adhesive by solid content is preferably adjusted to a range of from 4/1 to 50/1, more preferably from 20/3 to 20/1. If the weight ratio of the adhesive exceeds this range, the resulting ink absorption rate is occasionally reduced. On the contrary, if the weight ratio of the adhesive falls below this range, the resulting ink-receiving layer can be disadvantageously cracked.

Of course, the lower layer may contain other pigments incorporated therein besides the colloidal silica and adhesive if desired.

The lower layer in the ink-receiving layer of the present invention may contain a cationic resin incorporated therein if desired. In this arrangement, the ink-fixability can be enhanced.

Further, various auxiliaries to be used in the production of ordinary coated paper, such as dispersant, thickening agent, anti-foaming agent, coloring agent, antistatic agent and preservative may be properly incorporated in the lower layer.

The coated amount of the lower layer is not specifically limited but is preferably adjusted to a range of from 3 to 60 $g/m^2$, more preferably from 5 to 40 $g/m^2$. If the coated amount of the lower layer falls below this range, the resulting ink absorption is reduced. On the contrary, if the coated amount of the lower layer exceeds this range, the resulting effect is uselessly saturated. In order to attain an amount of coating as high as not less than 15 $g/m^2$, the viscosity or concentration of the coating solution can be raised. Alternatively, a batchwise application of the coating solution may be effected to attain such a high amount of coating.

The upper layer will be described hereinafter. The upper layer can be obtained by applying an upper layer coating solution to the lower layer. The basic constitution of the upper layer is the same as that of the lower layer. In order to obtain a desired print density, the particle diameter of the upper layer is preferably smaller than that of the lower layer. The average particle diameter of the upper layer is preferably adjusted to a range of from 10 nm to 300 nm, more preferably from 20 nm to 150 nm. The content of the adhesive (binder) in the upper layer is adjusted to a range of from 2 to 25 parts by weight based on 100 parts by weight of the colloidal silica used. However, it is more effective that the content of the adhesive in the upper layer is less than that of the lower layer. Further, pigments, water-soluble resins or cationic resins as mentioned above or various auxiliaries to be used in the production of ordinary coated paper, such as dispersant, thickening agent, anti-foaming agent, coloring agent, antistatic agent and preservative may be properly incorporated in the upper layer if desired.

An ink-receiving layer containing colloidal silica and an adhesive incorporated therein may be further formed under the lower layer to absorb the ink on a high density recorded area, thereby improving the absorption capacity of the ink-receiving layer.

Even if the third ink-receiving layer to be provided under the second colloidal silica-containing layer is an ordinary ink-absorbing layer, an ink jet recording sheet having a high ink absorption rate, a high print density, a high gloss and good printability and water resistance according to the object of the present invention can be obtained. From the standpoint of ink absorption rate, this ink-absorbing layer is preferably a pigment-containing layer rather than a layer containing a water-soluble resin alone.

The ink-absorbing layer between the support and the under layer will be further described hereinafter.

As the pigment to be incorporated in the ink-absorbing layer there may be properly used various common pigments known in the art of coated paper such as amorphous silica, clay, alumina and smectite. From the standpoint of print density or the like, silica or alumina is preferably used. Examples of the adhesive (binder) to be used in the ink-absorbing layer include adhesives such as PVA, modified PVA, casein and starches. The added amount of the adhesive is not limited but is adjusted to a range of from 5 to 150 parts by weight, preferably from 10 to 50 parts by weight based on 100 parts by weight of the pigment used.

Further, the ink-absorbing layer may contain the foregoing cationic resin (e.g., amine resin) incorporated therein to enhance the ink-fixability thereof. The added amount of such a cationic resin is preferably adjusted to a range of from 1 to 30 parts by weight, more preferably from 5 to 20 parts by weight based on 100 parts by weight of the pigment used. Further, various auxiliaries to be used in the production of ordinary coated paper, such as dispersant, thickening agent, anti-foaming agent, coloring agent, antistatic agent and preservative may be properly incorporated in the ink-absorbing layer.

The coated amount of the ink-absorbing layer is not specifically limited but is preferably adjusted to a range of from 3 to 30 g/$m^2$. If the coated amount of the ink-absorbing layer falls below this range, the resulting ink absorption disadvantageously runs short. On the contrary, if the coated amount of the ink-absorbing layer exceeds this range, the resulting effect is uselessly saturated.

Examples of the coating apparatus for obtaining any ink-receiving layer include various known coating apparatus such as blade coater, air knife coater, roll coater, bar coater, gravure coater, rod blade coater, lip coater and curtain coater.

An embodiment of the ink jet recording sheet wherein the recording layer contains at least one polyvinyl alcohol selected from the group consisting of polyvinyl alcohol having a percent saponification of not less than 95% and a polymerization degree of not more than 1,100 and a silicon-containing modified polyvinyl alcohol having a polymerization degree of not more than 1,100 as a water-soluble resin and a colloidal silica incorporated therein will be described hereinafter.

Firstly, the case where the ink-receiving layer consists of a single layer will be described. The ink-receiving layer contains a colloidal silica and a polyvinyl alcohol (hereinafter referred to as "PVA") having a percent saponification of not less than 95% and a polymerization degree of not more than 1,100 incorporated therein as main components or contains a colloidal silica and a silicon-containing modified PVA incorporated therein as main components.

The PVA solution having a polymerization degree of not more than 1,100 has a relatively low viscosity (A 4% aqueous solution of PVA having a polymerization degree of 500 has a viscosity of about 5 cps while a 4% aqueous solution of PVA having a polymerization degree of 1,500 has a viscosity of 25 cps). When such a PVA solution is mixed with a colloidal silica, PVA molecules are uniformly adsorbed by the surface of colloidal silica to obtain a uniform dispersion of colloidal silica and PVA. Thus, it is thought that when this dispersion is applied to a sheet, an ink-receiving layer excellent both in transparency and gloss can be obtained. If the polymerization degree exceeds 1,100, the PVA solution has an increased viscosity and hence a remarkably reduced miscibility with colloidal silica, making it difficult to obtain a uniform dispersion of colloidal silica and PVA. Accordingly, only a dispersion containing a large amount of secondary colloidal silica particles can be obtained. The resulting ink-receiving layer exhibits deteriorated transparency and gloss. The polymerization degree is preferably from 250 to 950.

Further, the selection of PVA having a percent saponification of not less than 95% makes it possible to obtain an ink-receiving layer having an extremely good water resistance. If the percent saponification falls below 95%, the resulting ink-receiving layer can be easily dissolved in water and thus cannot be provided with a desired water resistance. More preferably, the percent saponification is not less than 98%.

On the other hand, the silicon-containing modified PVA is inherently excellent in water resistance. Therefore, if such a PVA has a polymerization degree of not more than 1,100, an ink jet recording sheet having a high gloss and good water resistance and printability according to the object of the present invention can be obtained. The polymerization degree is preferably from 250 to 950.

As the silicon-containing modified PVA there may be used PVA containing silyl group. In particular, PVA containing silyl group having a reactive substituent such as alkoxyl group, acyloxyl group, silanol group as hydrolyzate thereof and salt thereof is preferred.

As the silicon-containing modified PVA, the following compound can be exemplified.

Silicon-containing modified polyvinyl alcohol obtained by allowing a silicon-containing polymerizable monomer represented by $CH_2=C(R^1)Si(R^2)_n[O(CO)R^3]_{(3-n)}$ (in which $R^1$ represents a hydrogen atom or methyl group; $R^2$ represents a hydrogen atom, halogen atom, lower alkyl group, allyl group or lower alkyl group containing allyl group; $R^3$ represents a lower alkyl group; and n represents 0 to 2) and a vinyl acetate to undergo copolymerization in the presence of a radical polymerization initiator in an alcohol, and then saponifying the copolymer thus obtained The average particle diameter of the colloidal silica to be used in the embodiment is preferably adjusted to a range of from 10 nm to 300 nm, more preferably from 20 nm to 200 nm. Of course, two or more colloidal silica may be used in combination. The colloidal silica to be used may be anionic or cationic. The use of an anionic colloidal silica makes it possible to obtain a recording sheet having a high gloss and an excellent print density. On the other hand, the use of a cationic colloidal silica makes it possible to obtain a recording sheet excellent in long-term record preservability, particularly preservability against high humidity.

The weight ratio of colloidal silica to the foregoing at least one polyvinyl alcohol defined herein in the ink-receiving layer of the present embodiment by solid content is preferably adjusted to a range of from 4/1 to 50/1, more preferably from 20/3 to 20/1. If the weight ratio of colloidal silica falls below the above defined range, the resulting ink absorption rate is occasionally reduced. On the contrary, if the weight of colloidal silica exceeds the above defined range, the resulting ink-receiving layer can be cracked.

The sum of the content of colloidal silica and the foregoing at least one polyvinyl alcohol is preferably not less than 70% by weight based on the weight of the layer containing these components.

Of course, the colloidal silica may be used in combination with other pigments if desired.

Besides the foregoing specific polyvinyl alcohol, other adhesives (binders) may be additionally used so far as the effect of the present invention is not impaired.

In the embodiment, a cationic resin may be incorporated in the ink-receiving layer. Further, various auxiliaries to be used in the production of ordinary coated paper, such as dispersant, thickening agent, anti-foaming agent, coloring agent, antistatic agent and preservative may be properly incorporated in the ink-receiving layer.

The coated amount of the ink-receiving layer is not specifically limited but is preferably adjusted to a range of from 3 to 60 g/$m^2$, more preferably from 10 to 40 g/$m^2$. If the coated amount of the ink-receiving layer falls below this range, the ink cannot occasionally be fully absorbed during high density recording. On the contrary, if the coated amount of the ink-receiving layer exceeds this range, the resulting effect is uselessly saturated. In order to attain an amount of coating as high as not less than 15 g/$m^2$, the viscosity or concentration of the coating solution can be raised. Alternatively, a batchwise application of the coating solution may be effected to attain such a high amount of coating.

The ink-receiving layer consisting of two layers will be described hereinafter.

If the ink-receiving layer consists of two or more layers, at least one of the layers (preferably upper layer) contains colloidal silica and a polyvinyl alcohol having a percent saponification of not less than 95% and a polymerization degree of not more than 1,100 incorporated therein or contains colloidal silica and a silicon-containing modified PVA having a polymerization degree of not more than 1,100 incorporated therein. Of course, both the two layers may contain colloidal silica and PVA having a percent saponification of not less than 95% and a polymerization degree of not more than 1,100 or contain colloidal silica and a silicon-containing modified PVA having a polymerization degree of not more than 1,100.

If one layer (preferably upper layer) constituting the ink-receiving layer contains colloidal silica and PVA having a percent saponification of not less than 95% and a polymerization degree of not more than 1,100 incorporated therein or contains colloidal silica and a silicon-containing modified PVA having a polymerization degree of not more than 1,100 incorporated therein, it may have the same constitution as that of the foregoing single-layer ink-receiving layer. However, since the lower layer, too, has an ink absorption, the coated amount of the foregoing one layer (preferably upper layer) to dryness is preferably adjusted to a range of from 1 to 30 $g/m^2$, more preferably from 2 to 20 $g/m^2$. If the coated amount of the foregoing one layer falls below this range, the film-forming properties are deteriorated. On the contrary, if the coated amount of the foregoing one layer exceeds this range, the resulting effect is saturated.

If a lower layer is provided under the above defined ink-receiving layer containing colloidal silica incorporated therein, the lower layer is not specifically limited so far as it has an ink-receptivity. However, in order to obtain a clearer print, the lower layer preferably has a higher ink absorption rate than the above defined ink-receiving layer (upper layer). Accordingly, the lower layer preferably contains a pigment incorporated therein.

As the pigment there may be used one described in connection with FIG. 1D.

In the embodiment, the particle diameter of the pigment to be incorporated in the lower layer is not specifically defined. However, from the standpoint of ink absorption rate, the particle diameter of the pigment to be incorporated in the lower layer is preferably greater than that of colloidal silica in the upper layer. In this arrangement, the average pore diameter of voids formed between the pigments in the lower layer is greater than that of the upper layer. Thus, the ink which has passed through the upper layer can be rapidly absorbed by the lower layer, making it possible to obtain a clearer image.

As the adhesive (binder) there may be used the foregoing various binders. The added amount of the adhesive is preferably adjusted to a range of from 5 to 200 parts by weight, more preferably from 10 to 50 parts by weight based on 100 parts by weight of the pigment used.

Further, for the purpose of enhancing the ink-fixability, the lower layer may contain a cationic resin incorporated therein. Further, various auxiliaries to be used in the production of ordinary coated paper, such as dispersant, thickening agent, anti-foaming agent, coloring agent, antistatic agent and preservative may be properly incorporated in the lower layer.

The coated amount of the lower layer is not specifically limited but is preferably adjusted to a range of from 2 to 50 $g/m^2$ to fully absorb the ink even when high density recording is conducted. If the coated amount of the lower layer falls below this range, the ink absorption can be insufficient. On the contrary, if the coated amount of the lower layer exceeds this range, the resulting effect is uselessly saturated.

Examples of the coating apparatus for obtaining any ink-receiving layer include various apparatus such as blade coater, air knife coater, roll coater, bar coater, gravure coater, rod blade coater, lip coater and curtain coater.

If the ink-receiving layer consists of three or more layers, at least one of the layers (preferably upper layer) contains colloidal silica and a polyvinyl alcohol having a percent saponification of not less than 95% and a polymerization degree of not more than 1,100 incorporated therein or contains colloidal silica and a silicon-containing modified PVA having a polymerization degree of not more than 1,100 incorporated therein. The ink-receiving layer can be formed by the same method as described above.

The ink to be used herein is prepared by mixing a dye for forming an image with a solvent for dissolving or dispersing the dye therein, and optionally with various dispersants, surface active agents, viscosity adjustors, specific resistivity adjustors, pH adjustors, mildew-proofing agents, recording agent dissolution or dispersion stabilizers, etc.

As the recording agent to be incorporated in the ink there may be used a direct dye, acidic dye, basic dye, reactive dye, food dye, dispersed dye, oily dye or any other pigment. Conventional known dyes or pigments can be used without any restriction. The content of such a dye depends on the kind of solvent components, the characteristics required for the ink, etc. In the case of the ink of the present invention, too, the content of such a dye may be conventional, i.e., from 0.1 to 20% by weight.

Examples of the ink solvent to be used in the present invention there include water, and various water-soluble organic solvents such as $C_{1-4}$ alkylalcohol (e.g., ethyl alcohol, n-propyl alcohol, isopropyl alcohol, n-butyl alcohol, isobutyl alcohol), ketone, ketonealcohol, polyalkylene glycol, alkylene glycol having 2 to 6 alkylene groups, amide (e.g., dimethylformamide), ether (e.g., tetrahydrofuran) and lower alkylether of polyvalent alcohol (e.g., glycerin, ethylene glycol methyl ether).

EXAMPLE

The present invention will be further described in the following examples. Of course, the present invention is not limited to the following examples. The term "parts" and "%" as used hereinafter are determined as calculated in terms of solid content devoid of water by weight unless otherwise defined.

EXAMPLE I

The ink jet recording materials obtained were all subjected to supercalendering (linear pressure: 20 Kg/cm) before evaluation. The coated amount as used herein is represented by dry weight unless otherwise defined.

In order to avoid the effect of the support, the ink-receiving layers of the examples and comparative examples were all applied or transferred to a polyester film (Lumirror T, available from Toray Industries, Ltd.; 75 μm) before the measurement of peaks on the pore diameter distribution curve. For the measurement of other properties, the ink jet recording materials obtained in the examples and comparative examples were used.

EXAMPLE I-1

A 15% aqueous solution of a mixture of 100 parts of an anionic colloidal silica having an average particle diameter of 80 nm (MP-1040, available from Nissan Chemical Industries, Ltd.) as a dispersion of primary colloidal particles and 10 parts of a silicon-containing modified PVA (R-3109, available from Kuraray Co., Ltd.; polymerization degree: 900; percent saponification: 98.5%) was applied to the surface of a commercial coated paper (OK Coat, available from New Oji Paper Co., Ltd.; 127.9 g/$m^2$) which had been laminated (with a polyethylene to a 15 $\mu$m by extrusion laminate method (The term "laminated coated paper" as used herein has the same meaning as this unless otherwise defined)) by means of a mayor bar in an amount of 20 g/$m^2$, and then dried to prepare an ink jet recording material according to the present invention.

EXAMPLE I-2

A 15% aqueous solution of a mixture of 100 parts of a cationically-modified colloidal silica having an average particle diameter of 85 nm (AK-ZL, available from Nissan Chemical Industries, Ltd.) as a dispersion of primary colloidal particles and 13 parts of a silicon-containing modified PVA (R-2105, available from Kuraray Co., Ltd.; polymerization degree: 500; percent saponification: 98.5%) was applied to the surface of a laminated coated paper by means of a mayor bar in an amount of 20 g/$m^2$, and then dried to prepare an ink jet recording material according to the present invention.

EXAMPLE I-3

A 15% aqueous solution of a mixture of 100 parts of an anionic colloidal silica having an average particle diameter of 250 nm (MP-3030, available from Nissan Chemical Industries, Ltd.) as a dispersion of primary colloidal particles and 18 parts of a silicon-containing modified PVA (R-3109, available from Kuraray Co., Ltd.; polymerization degree: 900; percent saponification: 98.5%) was applied to the surface of a laminated coated paper by means of a mayor bar in an amount of 20 g/ml, and then dried to prepare an ink jet recording material according to the present invention.

EXAMPLE I-4

A 15% aqueous solution of a mixture of 100 parts of an anionic colloidal silica having an average particle diameter of 85 nm (Snowtex ZL, available from Nissan Chemical Industries, Ltd.) and 13 parts of a silicon-containing modified PVA (R-2105, available from Kuraray Co., Ltd.; polymerization degree: 500; percent saponification: 98.5%) was applied to the surface of a laminated coated paper by means of a mayor bar in an amount of 15 g/$m^2$, and then dried. Subsequently, a 15% aqueous solution of a mixture of 100 parts of an anionic colloidal silica having an average particle diameter of 65 nm (Snowtex YL, available from Nissan Chemical Industries, Ltd.) as a dispersion of primary colloidal particles and 8 parts of a silicon-containing modified PVA (R-2105, available from Kuraray Co., Ltd.; polymerization degree: 500; percent saponification: 98.5%) was applied to the foregoing coating layer by means of a mayor bar in an amount of 10 g/$m^2$, and then dried to prepare an ink jet recording material according to the present invention.

EXAMPLE I-5

A 15% aqueous solution of a mixture of 100 parts of an anionic colloidal silica having an average particle diameter of 85 nm (Snowtex ZL, available from Nissan Chemical Industries, Ltd.) as a dispersion of primary colloidal particles and 13 parts of a silicon-containing modified PVA (R-2105, available from Kuraray Co., Ltd.; polymerization degree: 500; percent saponification: 98.5%) was applied to a PET film (Lumirror T, available from Torary Industries, Ltd.; surface roughness Ra: 0.02 $\mu$m) which was used as a forming material by means of a mayor bar in an amount of 20 g/$m^2$, and then dried.

Subsequently, an acrylic ester adhesive (A-02, available from Nippon Carbide Industries Co., Inc.) was applied to the surface of a laminated coated paper in a dry amount of 20 g/$m^2$, and then dried. Subsequently, the two coated materials were bonded to each other in such an arrangement that the ink-receiving layer and the adhesive were opposed to each other. The laminate was then subjected to contact-bonding by means of a calender at a linear pressure of 10 kg/cm. Subsequently, the PET film was peeled off the laminate to prepare an ink jet recording material according to the present invention.

EXAMPLE I-6

A 15% aqueous solution of a mixture of 100 parts of an anionic colloidal silica having an average particle diameter of 65 nm (Snowtex YL, available from Nissan Chemical Industries, Ltd.) as a dispersion of primary colloidal particles and 8 parts of a silicon-containing modified PVA (R-2105, available from Kuraray Co., Ltd.; polymerization degree: 500; percent saponification: 98.5%) was applied to a PET film (Lumirror T. available from Toray Industries, Ltd.; surface roughness Ra: 0.02 $\mu$m, thickness 75 $\mu$m) which was used as a forming material by means of a mayor bar in an amount of 10 g/$m^2$, and then dried.

Subsequently, a 15% aqueous solution of a mixture of 100 parts of an anionic colloidal silica having an average particle diameter of 85 nm (Snowtex ZL, available from Nissan Chemical Industries, Ltd.) and 13 parts of a silicon-containing modified PVA (PVA-2105, available from Kuraray Co., Ltd.; polymerization degree: 500; percent saponification: 98.5%) was applied to the foregoing coating layer by means of a mayor bar in a dry amount of 15 g/$m^2$, and then dried.

Subsequently, an acrylic ester adhesive (A-02, available from Nippon Carbide Industries Co., Inc.) was applied to the surface of the foregoing coating layer in a dry amount of 20 g/$m^2$, and then dried. Subsequently, the two coated materials were bonded to each other in such an arrangement that the adhesive and the surface of the laminated coated paper were opposed to each other. The laminate was then subjected to contact-bonding by means of a calender at a linear pressure of 10 kg/cm. Subsequently, the PET film was peeled off the laminate to prepare an ink jet recording material according to the present invention.

EXAMPLE I-7

A 15% aqueous solution of a mixture of 100 parts of an anionic colloidal silica having an average particle diameter of 9 nm (Snowtex S, available from Nissan Chemical Industries, Ltd.) as a dispersion of primary colloidal particles and 30 parts of a silicon-containing modified PVA (R-2105, available from Kuraray Co., Ltd.; polymerization degree: 500; percent saponification: 98.5%) was applied to the surface of a laminated coated paper by means of a mayor bar in a dry amount of 20 g/$m^2$, and then dried to prepare an ink jet recording material.

EXAMPLE I-8

A 15% aqueous solution of a mixture of 100 parts of an anionic colloidal silica having an average particle diameter of 400 nm (available from Nissan Chemical Industries, Ltd.) as a dispersion of primary colloidal particles and 20 parts of a silicon-containing modified PVA (R-2105, available from Kuraray Co., Ltd.; polymerization degree: 500; percent saponification: 98.5%) was applied to the surface of a laminated coated paper by means of a mayor bar in a dry amount of 20 g/$m^2$, and then dried to prepare an ink jet recording material.

Comparative Example I-1

A 15% aqueous solution of a mixture of 100 parts of an amorphous silica (Fineseal X-45, available from Tokuyama Corp.; average particle diameter: 4.5 μm) as an agglomeration of synthetic silica particles, 25 parts of PVA (PVA-117, available from Kuraray Co., Ltd.) and 5 parts of a cationic resin (SR-1001, available from Sumitomo Chemical Co., Ltd.) was applied to the surface of a laminated coated paper by means of a mayor bar in a dry amount of 10 g/$m^2$, and then dried to prepare an ink jet recording material.

Comparative Example I-2

A gloss-developing layer was applied to the coating layer of Comparative Example 1. The composition of the gloss-developing layer was a 20% aqueous solution of a mixture of 100 parts of a colloidal silica having an average particle diameter of 300 nm (available from Nissan Chemical Industries, Ltd.) and 10 parts of a styrene-butadiene latex (0693, available from Japan Synthetic Rubber Co., Ltd.). The gloss-developing layer was applied in a dry amount of 5 g/$m^2$, and then dried. After drying, the material was subjected to calendering at a chilled roll surface temperature of 60° C. and a linear pressure of 100 kg/cm in such an arrangement that the coated surface of the gloss-developing layer was brought into contact with the chilled roll to obtain an ink jet recording material.

Comparative Example I-3

A 10% aqueous solution of PVA (PVA-117, available from Kuraray Co., Ltd.) was applied to a laminated coated paper by means of mayor bar in an amount of 20 g/$m^2$, and then dried to prepare an ink jet recording material.

[Evaluation Method]

The pore diameter distribution (set forth in Table 1) of the ink jet recording paper sheets obtained in Examples I-1 to 8 and Comparative Examples I-1 to 3 were measured by the method described in the specification. The water resistance, water absorption, etc. of these ink jet recording paper sheets were evaluated by the methods described below. For the evaluation of gloss and ink absorption, recording was conducted on these ink jet recording paper sheets by means of a commercial ink jet printer (BJC-600J, available from Canon Inc.). The gloss, ink absorption and print density on the solid area were then measured.

[Water Resistance]

A water droplet was dropped onto the ink jet recording sheet. After 30 minutes, the water droplet was wiped off the sheet. The sheet was then rubbed with a hand on the area impregnated with water. The water resistance was evaluated according to the following four-step criterion.

◎: No change is observed on the ink-receiving layer;

○: Ink-receiving layer is slightly peeled off;

Δ: Ink-receiving layer is partly peeled off; and

X: Ink-receiving layer is entirely peeled off

[Ink Absorption]

For the evaluation of ink absorption, a wood free paper was applied to the printed surface of the ink jet recording material every 5 seconds shortly after printing to see whether or not the ink was transferred to the woodfree paper. The time required until no ink is transferred to the woodfree paper was determined. The ink absorption was then evaluated according to the following four-step criterion.

◎: Not more than 5 seconds;

○: 5 to 10 seconds;

Δ: 10 to 30 seconds; and

X: Not less than 30 seconds

[Print density]

The ink jet recording material was measured for print density on the black solid area by means of a Macbeth reflection densitometer (Macbeth, RD-920). The figure shown in the tables below is the mean of five measurements.

[Gloss (luster) on the printed area]

For the evaluation of the gloss on the printed area, the printed area was visually observed at a horizontal angle of 20°. The gloss on the printed area was evaluated according to the following four-step criterion.

◎: Same level of luster as color photograph is felt;

○: Luster inferior to color photograph but still high is felt;

Δ: Luster as high as printed coated paper is felt; and

X: Luster as high as ordinary PPC is felt

TABLE 1

| | Ink absorption | Water resistance | Print density | Gloss on printed area | Peak on pore distribution |
|---|---|---|---|---|---|
| Example I-1 | ◎ | ◎ | 1.90 | ○ | 25 nm |
| Example I-2 | ◎ | ◎ | 1.83 | ○ | 25 nm |
| Example I-3 | ◎ | ◎ | 1.52 | ○ | 70 nm |
| Example I-4 | ◎ | ◎ | 2.00 | ○ | 15 nm, 25 nm |
| Example I-5 | ◎ | ◎ | 1.90 | ◎ | 20 nm |
| Example I-6 | ◎ | ◎ | 1.97 | ◎ | 10 nm, 20 nm |
| Example I-7 | Δ | ○ | 2.35 | ○ | <2 nm |
| Example I-8 | ◎ | ◎ | 1.35 | Δ–○ | 120 nm |
| Comparative Example I-1 | ◎ | Δ | 1.23 | X | 20 nm*, 2μ* |
| Comparative Example I-2 | ◎ | Δ | 1.32 | X–Δ | 20 nm*, 95 nm*, 2μ* |
| Comparative Example I-3 | X | X | 1.93 | Δ | 2 < 2 nm* |

*Peak on the pore diameter distribution curve of ink-receiving layers other than layer containing colloidal silica incorporated therein as main component Table 1 shows that the ink jet recording sheets obtained according to the constitution of the present invention exhibit a good water resistance and ink absorption and still show a high gloss and a high print density even after receiving an ink.

The ink jet recording materials of the present invention have a high gloss as well as a high adaptability to ink jet recording (printing), high print density and moisture and water resistance.

EXAMPLE II-1

A 10% aqueous solution of a mixture of 100 parts of a colloidal silica having an average particle diameter of 50 nm (Snowtex OL, available from Nissan Chemical Industries, Ltd.) and 20 parts of PVA (PVA 117, available from Kuraray Co., Ltd.) was applied to a PET film (Lumirror T, available from Toray Industries, Ltd.; 75 μm; surface roughness Ra: 0.02 μm) which was used as a forming material by means of a mayor bar in an dry amount of 15 g/$m^2$, and then dried at a temperature of 120° C. for 2 minutes to obtain a sheet having a recording layer with a water content of 4% (FIG. 1A).

Subsequently, an acrylic ester adhesive (A-02, available from Nippon Carbide Industries Co., Inc.) was applied to the surface of a commercial coated paper (OK Coat, available from New Oji Paper Co., Ltd.; weight: 127.9 g/$m^2$) to a thickness of 15 $\mu$m (FIG. 1B). The two coating materials were then bonded to each other in such an arrangement that the adhesive layer was brought into contact with the foregoing recording layer (FIG. 1C). The laminate was then subjected to bonding by means of a calender. The PET film was then peeled off the laminate to prepare an ink jet recording sheet according to the present invention (FIG. 1D).

EXAMPLE II-2

A 10% aqueous solution of a mixture of 100 parts of a colloidal silica having an average particle diameter of 0.05 $\mu$m (Snowtex OL, available from Nissan Chemical Industries, Ltd.) and 20 parts of PVA (PVA 117, available from Kuraray Co., Ltd.) was applied to a PET film (Lumirror T, available from Toray Industries, Inc.; 75 $\mu$m; surface roughness Ra: 0.02 $\mu$m) which was used as a forming material by means of a mayor bar in an dry amount of 15 g/$m^2$, and then dried at a temperature of 120° C. for 2 minutes to obtain a sheet having a recording layer with a water content of 4% (FIG. 1A).

Subsequently, a molten polyethylene (Mitsubishi Polyethylene LD, available from Mitsubishi Chemical Corp.) (melting temperature: 280 to 300° C.) was applied to the surface of a commercial coated paper (OK Coat, available from New Oji Paper Co., Ltd.; weight: 127.9 g/$m^2$) by extrusion laminate method to a thickness of 15 $\mu$m (FIG. 1B) while being subjected to corona discharge treatment on both sides thereof. The two coating materials were then bonded to each other in such an arrangement that the molten polyethylene resin layer was brought into contact with the foregoing recording layer (FIG. 1C). The laminate was then cooled and subjected to contact-bonding by means of a cooling roll. The PET film was then peeled off the laminate to prepare an ink jet recording sheet according to the present invention (FIG. 1D).

EXAMPLE II-3

A 20% aqueous solution of a mixture of 100 parts of a colloidal silica having an average particle diameter of 65 nm (Snowtex YL, available from Nissan Chemical Industries, Ltd.) and 10 parts of PVA (PVA 117, available from Kuraray Co., Ltd.) was applied to a PET film (Lumirror T, available from Toray Industries, Ltd.) which was used as a forming material in an amount of 10 g/$m^2$, and then dried at a temperature of 120° C. for 2 minutes.

Subsequently, a 20% aqueous solution of a mixture of 100 parts of a cationically-modified colloidal silica having an average particle diameter of 85 nm (AK-ZL, available from Nissan Chemical Industries, Ltd.) and 15 parts of PVA (PVA 117) was applied to the foregoing coating layer by means of a mayor bar in an amount of 10 g/$m^2$, and then dried at a temperature of 120° C. for 2 minutes to obtain a sheet shown in FIG. 2A.

Subsequently, a molten polyethylene (Mitsubishi Polyethylene LD, available from Mitsubishi Chemical Industries, Ltd.) (melting temperature: 280 to 300° C.) was applied to the surface of a commercial coated paper (OK Coat, available from New Oji Paper Co., Ltd.; weight: 127.9 g/$m^2$) by melt extrusion coating method (extrusion laminate method) to a thickness of 15 $\mu$m (FIG. 2B) while being subjected to corona discharge treatment on both sides thereof. The two coating materials were then bonded to each other in such an arrangement that the molten polyethylene resin layer was brought into contact with the foregoing recording layer (FIG. 2C). The laminate was then cooled and subjected to contact-bonding by means of a cooling roll. The PET film was then peeled off the laminate to prepare an ink jet recording sheet according to the present invention (FIG. 2D).

Comparative Example II-1

A 15% aqueous solution of a mixture of 100 parts of an amorphous silica (Fineseal X-45, available from Tokuyama Co., Ltd.; average particle diameter: 4.5 $\mu$m) as an agglomeration of synthetic silica particles, 30 parts of PVA (PVA-117, available from Kuraray Co., Ltd.) and 15 parts of a cationic resin (SR-1001, available from Sumitomo Chemical Co., Ltd.) was applied to the laminated surface of a laminated coated paper by means of a mayor bar in a dry amount of 15 g/$m^2$, and then dried. Subsequently, a gloss-developing layer was applied to the surface of the coating layer. The gloss-developing layer was obtained by applying a gloss-developing layer composition to the surface of the coating layer, and then subjecting the coated material to casting. The casting was accomplished by a direct method which comprises applying the coating solution of the gloss-developing layer to the surface of the coating layer, and then, after 2 seconds, pressing the coated material against a mirror-like roll which had been heated to a surface temperature of 90° C. so that it was dried. As the composition of the gloss-developing layer there was used a 10% aqueous solution of a mixture of 100 parts of a colloidal silica having an average particle diameter of 250 nm (MP-3030, available from Nissan Chemical Industries, Ltd.), 25 parts of a styrene-butadiene latex (0693, available from Japan Synthetic Rubber Co., Ltd.) and 3 parts of potassium oleate. The composition of the gloss-developing layer was applied to the surface of the coating layer by a casting method using a roll coater in an amount of 3 g/$m^2$ to obtain the gloss-developing layer. Thus, an ink jet recording sheet was prepared.

EXAMPLE II-4

An ink jet recording layer was provided on a PET film in the same manner as in Example II-1.

Subsequently, an acrylic ester adhesive (A-02, available from Nippon Carbide Industries Co., Inc.) was applied to the surface of the ink recording layer in an dry amount of 20 g/$m^2$. The coated material was then laminated with a commercial coated paper (OK coat, available from New Oji Paper Co., Ltd.; weight: 127.9 g/$m^2$). The laminate was then subjected to bonding by means of a calender. The PET film was then peeled off the laminate to prepare an ink jet recording material

[Evaluation Method]

The water resistance, gloss and water absorption of the ink jet recording paper sheets obtained in the various examples and comparative examples were evaluated by the methods described below. For the evaluation of gloss and ink absorption, recording was conducted on these ink jet recording paper sheets by means of a commercial ink jet printer (BJC-600J, available from Canon Inc.). The gloss, ink absorption and print density on the solid area were then measured.

[Gloss (luster) on the Printed Area]

For the evaluation of the gloss on the printed area, the printed area was visually observed at a horizontal angle of 20°. The gloss on the printed area was evaluated according to the following four-step criterion.

◎: Same level of luster as color photograph is felt;

○: Luster inferior to color photograph but still high is felt;

Δ: Luster as high as printed coated paper is felt; and

X: Luster as high as ordinary PPC is felt

[Water Resistance]

A water droplet was dropped onto the ink jet recording sheet. After 30 minutes, the water droplet was wiped off the sheet. The sheet was then rubbed with a hand on the area impregnated with water. The water resistance was evaluated according to the following three-step criterion.

◎: No change is observed on the ink-receiving layer;

Δ: Ink-receiving layer is partly peeled off; and

X: Ink-receiving layer is entirely peeled off

[Ink Absorption]

For the evaluation of ink absorption, a woodfree paper was applied to the printed surface of the ink jet recording material every 5 seconds shortly after printing to see whether or not the ink was transferred to the woodfree paper. The time required until no ink is transferred to the woodfree paper was determined. The ink absorption was then evaluated according to the following four-step criterion.

◎: Not more than 5 seconds;

○: 5 to 10 seconds;

Δ: 10 to 30 seconds; and

X: Not less than 30 seconds

The ink jet recording paper sheets which take 10 seconds or less until the ink is dried are excellent in ink absorption.

TABLE 2

| | Gloss on printed area | Ink absorption | Water resistance |
|---|---|---|---|
| Example II-1 | ◎ | ○ | ○ |
| Example II-2 | ◎ | ○ | ○ |
| Example II-3 | ◎ | ◎ | ○ |
| Comparative Example II-1 | X–Δ | ○ | Δ |
| Example II-4 | ◎ | Δ | ○ |

Table 2 shows that the ink jet recording sheets obtained according to the preparation process of the present invention exhibit a good water resistance and ink-receptivity and still shows a high gloss even after receiving an ink. The ink jet recording sheet of Example II-1 exhibits an excellent ink absorption. On the other hand, the ink jet recording sheet of Example II-4 exhibits a reduced ink absorption probably because the acrylic ester adhesive was applied to the recording layer rather than to the support, giving some effects on the ink absorption.

EXAMPLE III-1

A 10% aqueous solution of a mixture of 100 parts of an anionic colloidal silica having an average particle diameter of 45 nm (Snowtex 20L, available from Nissan Chemical Industries, Ltd.) and 7.5 parts of PVA (PVA R-2105, available from Kuraray Co., Ltd.) was applied to a PET film (Lumirror T, available from Toray Industries, Ltd.; 75 μ; surface roughness Ra: 0.02 μm) which was used as a forming material by means of a mayor bar in an amount of 5 g/m$^2$, and then dried to obtain an upper layer (pigment content: 93%).

Subsequently, a 20% aqueous solution of a mixture of 100 parts of a cationic colloidal silica having an average particle diameter of 80 nm (Snowtex AK-ZL, available from Nissan Chemical Industries, Ltd.) and 15 parts of PVA (PVA 117) was applied to the foregoing upper layer by means of a mayor bar in an amount of 25 g/m$^2$, and then dried to obtain a lower layer as an ink-receiving layer.

Subsequently, a molten polyethylene (Mitsubishi Polyethylene LD, available from Mitsubishi Chemical Industries, Ltd.) (melting temperature: 280 to 300° C.) was applied to the surface of a commercial coated paper (OK Coat, available from New Oji Paper Co., Ltd.: weight: 127.9 g/m$^2$) as a support by melt extrusion coating method (extrusion laminate method) to a thickness of 20 μm while being subjected to corona discharge treatment on both sides thereof. The two coating materials were then bonded to each other in such an arrangement that the molten polyethylene resin layer was brought into contact with the foregoing ink-receiving layer. The laminate was then cooled and subjected to contact-bonding by means of a cooling roll. The PET film was then peeled off the laminate to prepare an ink jet recording sheet according to the present invention.

EXAMPLE III-2

A 10% aqueous solution of a mixture of 100 parts of an anionic colloidal silica having an average particle diameter of 45 nm (Snowtex 20L, available from Nissan Chemical Industries, Ltd.) and 20 parts of PVA (PVA 117, available from Kuraray Co., Ltd.) was applied to a PET film (Lumirror T, available from Toray Industries, Ltd.; 75 μ; surface roughness Ra: 0.02 μm) which was used as a forming material by means of a mayor bar in an amount of 5 g/m$^2$, and then dried to obtain an upper layer (pigment content: 83%).

Subsequently, a 20% aqueous solution of a mixture of 100 parts of an amorphous silica (Mizucasil P-709, available from Mizusawa Chemical Industrial, Ltd.; average particle diameter: 4 μm) as an agglomeration of synthetic silica, 30 parts of PVA (PVA 117, available from Kuraray Co., Ltd.) and 15 parts of a cationic resin (SR-1001, available from Sumitomo Chemical Co., Ltd.) was applied to the foregoing upper layer by means of a mayor bar in an dry amount of 15 g/m$^2$, and then dried to obtain a lower layer.

Subsequently, a molten polyethylene (Mitsubishi Polyethylene LD, available from Mitsubishi Chemical Industries, Ltd.) (melting temperature: 280 to 300° C.) was applied to the surface of the foregoing lower layer by melt extrusion coating method (extrusion laminate method) to a thickness of 30 μm while being subjected to corona discharge treatment on both sides thereof. The two coating materials were then bonded to each other in such an arrangement that the molten polyethylene resin layer was brought into contact with a commercial coated paper (OK Coat, available from New Oji Paper Co., Ltd.; weight: 127.9 g/m$^2$). The laminate was then cooled and subjected to contact-bonding by means of a cooling roll. The PET film was then peeled off the laminate to prepare an ink jet recording sheet according to the present invention.

EXAMPLE III-3

A 10% aqueous solution of a mixture of 100 parts of an anionic colloidal silica having an average particle diameter of 45 nm (Snowtex 20L, available from Nissan Chemical Industries, Ltd.) and 30 parts of PVA (PVA 105, available from Kuraray Co., Ltd.) was applied to a PET film (Lumirror T, available from Toray Industries, Ltd.; 75 μ; surface roughness Ra: 0.02 μm) which was used as a forming material by means of a mayor bar in an amount of 5 g/m$^2$, and then dried to obtain an upper layer (pigment content: 77%).

Subsequently, a lower layer was provided on the upper layer in the same manner as in Example III-1. The coating material was then bonded to a commercial coated paper (OK Coat, available from New Oji Paper Co., Ltd.; weight: 127.9 g/m$^2$) on which a polyethylene resin laminate layer had been formed in the same manner as in Example III-1. The PET film was then peeled off the laminate to prepare an ink jet recording sheet according to the present invention.

EXAMPLE III-4

A 10% aqueous solution of a mixture of 100 parts of an anionic colloidal silica having an average particle diameter of 250 nm (Snowtex MP-3030, available from Nissan Chemical Industries, Ltd.) and 15 parts of PVA (PVA 117, available from Kuraray Co., Ltd.) was applied to a PET film (Lumirror T, available from Toray Industries, Ltd.; 75 μ; surface roughness Ra: 0.02 μm) which was used as a forming material by means of a mayor bar in an dry amount of 5 g/m$^2$. and then dried to obtain an upper layer (pigment content: 87%).

Subsequently, a lower layer was provided on the upper layer in the same manner as in Example III-1. The coating material was then bonded to a commercial coated paper (OK Coat, available from New Oji Paper Co., LTd.; weight: 127.9 g/m$^2$) on which a polyethylene resin laminate layer had been formed in the same manner as in Example III-1. The PET film was then peeled off the laminate to prepare an ink jet recording sheet according to the present invention.

[Evaluation Method]

The water resistance, gloss and water absorption of the ink jet recording paper sheets obtained in Examples III-1 to 4 were evaluated by the methods described below. For the evaluation of gloss and ink absorption, recording was conducted on these ink jet recording paper sheets by means of a commercial ink jet printer (BJC-600J, available from Canon Inc.). The gloss, ink absorption and print density on the solid area were then measured.

[Gloss (luster) on the printed area]

For the evaluation of the gloss on the printed area, the printed area was visually observed at a horizontal angle of 20°. The gloss on the printed area was evaluated according to the following four-step criterion.

⊚: Same level of luster as color photograph is felt;

○: Luster inferior to color photograph but still high is felt;

Δ: Luster as high as printed coated paper is felt; and

X: Luster as high as ordinary PPC is felt

[Water Resistance]

A water droplet was dropped onto the ink jet recording sheet. After 30 minutes, the water droplet was wiped off the sheet. The sheet was then rubbed with a hand on the area impregnated with water. The water resistance was evaluated according to the following three-step criterion.

⊚: No change is observed on the ink-receiving layer;

Δ: Ink-receiving layer is partly peeled off; and

X: Ink-receiving layer is entirely peeled off

[Ink Absorption]

For the evaluation of ink absorption, a woodfree paper was applied to the printed surface of the ink jet recording material every 5 seconds shortly after printing to see whether or not the ink was transferred to the woodfree paper. The time required until no ink is transferred to the woodfree paper was determined. The ink absorption was then evaluated according to the following four-step criterion.

⊚: Not more than 5 seconds;

○: 5 to 10 seconds;

Δ: 10 to 30 seconds; and

X: Not less than 30 seconds

The ink jet recording paper sheets which take 10 seconds or less until the ink is dried are excellent in ink absorption.

[Print density]

The ink jet recording material was measured for print density on the black solid area by means of a Macbeth reflection densitometer (Macbeth, RD-920). The figure shown in the tables below is the mean of five measurements.

TABLE 3

| | Print density | Print gloss | Ink absorption | Water resistance |
|---|---|---|---|---|
| Example III-1 | 2.15 | ⊚ | ⊚ | ○ |
| Example III-2 | 2.15 | Δ–○ | ○ | ○ |
| Example III-3 | 2.15 | ⊚ | Δ | ○ |
| Example III-4 | 1.45 | ○–⊚ | ⊚ | ○ |

Table 3 shows that the ink jet recording sheets obtained according to the preparation process of the present invention exhibit a good water resistance and ink-receptivity and still shows a high gloss even after receiving an ink.

EXAMPLE IV-1

A 15% aqueous solution of a mixture of 100 parts of a cationically-modified colloidal silica having an average particle diameter of 85 nm (Snowtex AK-ZL, available from Nissan Chemical Industries, Ltd.) and 15 parts of a silicon-containing modified PVA (R-2105, available from Kuraray Co., Ltd.; percent saponification: 98.5%; polymerization degree: 500) was applied to the laminated surface of a printing coated paper (OK Coat, available from New Oji Paper Co., Ltd.; weight: 127.9 g/m$^2$) on which a polyethylene was laminated to a thickness of 15 μm by extrusion laminate method on one side thereof (hereinafter simply abbreviated as "laminated coated paper") by means of a mayor bar in an dry amount of 15 g/m $^2$ and then dried. Subsequently, a 15% aqueous solution of a mixture of 100 parts of a cationically-modified colloidal silica having an average particle diameter of 65 nm (Snowtex AK-YL, available from Nissan Chemical Industries, Ltd.) and 10 parts of a silicon-containing modified PVA (R-2105, available from Kuraray Co., Ltd.) was applied to the foregoing coating layer by means of a mayor bar in an dry amount of 10 g/m$^2$, dried, and then smoothened by means of a calender to prepare an ink jet recording material according to the present invention.

EXAMPLE IV-2

A 15% aqueous solution of a mixture of 100 parts of a cationically-modified colloidal silica having an average particle diameter of 45 nm (Snowtex AK-XL, available from Nissan Chemical Industries, Ltd.) and 8 parts of PVA (R-2105, available from Kuraray Co., Ltd.) was applied to a PET film (Lumirror T, available from Toray Industries, Ltd.; 75 μ; surface roughness Ra: 0.02 μm) which was used as a forming material by means of a mayor bar in an amount of 10 g/m$^2$, and then dried.

Subsequently, a 15% aqueous solution of a mixture of 100 parts of a cationically-modified colloidal silica having an average particle diameter of 85 nm (Snowtex AK-ZL, available from Nissan Chemical Industries, Ltd.) and 15 parts of silicon-containing modified PVA (R-2105, available from Kuraray Co., Ltd.) was applied to the foregoing coating layer by means of a mayor bar in an amount of 15 g/m$^2$, and then dried.

Subsequently, a molten polyethylene (Mitsubishi Polyethylene LD, available from Mitsubishi Chemical Industries, Ltd.) (melting temperature: 280 to 300° C.) was applied to the corona-discharged surface of a commercial coated paper (OK Coat, available from New Oji Paper Co., Ltd.; weight: 127.9 g/$m^2$) as a support by melt extrusion coating method (extrusion laminate method) to a thickness of 30 μm while being subjected to corona discharge treatment on one side thereof. The two coating materials were then bonded to each other in such an arrangement that the molten polyethylene resin layer was brought into contact with the foregoing ink-receiving layer. The laminate was then cooled and subjected to contact-bonding by means of a cooling roll. The PET film was then peeled off the laminate. The laminate was then smoothened by means of a supercalender to prepare an ink jet recording material according to the present invention.

EXAMPLE IV-3

A 10% aqueous solution of a mixture of 100 parts of a colloidal silica having an average particle diameter of 45 nm (Snowtex 20L, available from Nissan Chemical Industries, Ltd.) and 10 parts of a silicon-containing modified polyvinyl alcohol (modified PVA having a percent vinyl acetate unit saponification of 88.5 mol-% and a polymerization degree of 1,000 containing 0.5 mol-% of a vinylsilane unit obtained by saponifying a copolymer of vinyl acetate and vinyl trimethoxy silane) was applied to the surface of a laminated paper on which a polyethylene had been laminated in the same manner as in Example IV-1, and then dried to prepare an ink jet recording sheet according to the present invention.

EXAMPLE IV-4

A 10% aqueous solution of a mixture of 100 parts of a colloidal silica having an average particle diameter of 45 nm (Snowtex 20L, available from Nissan Chemical Industries, Ltd.) and 10 parts of a polyvinyl alcohol (MP-103, available from Kuraray Co., Ltd.; percent saponification: 98.5; polymerization degree: 300) was applied to the surface of the same laminated paper as used in Example IV-1, and then dried to prepare an ink jet recording sheet according to the present invention.

EXAMPLE IV-5

A 10% aqueous solution of a mixture of 100 parts of a cationic colloidal silica having an average particle diameter of 65 nm (Snowtex AK-YL, available from Nissan Chemical Industries, Ltd.) and 10 parts of a silicon-containing modified polyvinyl alcohol (R-2105, available from Kuraray Co., Ltd.; percent saponification: 98.5; polymerization degree: 500) was applied to a PET film (Lumirror T, available from Toray Industries, Ltd.; 75 μ; surface roughness Ra: 0.02 μm) which was used as a forming material by means of a mayor bar in an dry amount of 5 g/$m^2$, and then dried.

Subsequently, a 20% aqueous solution of a mixture of 100 parts of an amorphous silica (Fineseal X-45, available from Tokuyama Co., Ltd.; average particle diameter: 4.5 μm) as an agglomeration of synthetic silica particles, 30 parts of PVA (PVA-117, available from Kuraray Co., Ltd.; percent saponification: 98.5; polymerization degree: 1,750) and 15 parts of a cationic resin (SR-1001, available from Sumitomo Chemical Co., Ltd.) was applied to the foregoing coating layer by means of a mayor bar in an amount (dried) of 15 g/$m^2$, and then dried.

Subsequently, a molten polyethylene (Mitsubishi Polyethylene LD, available from Mitsubishi Chemical Industries, Ltd.) (melting temperature: 280 to 320° C.) was applied to the surface of the ink-receiving layer by melt extrusion coating method (extrusion laminate method) to a thickness of 30 μm while being subjected to corona discharge treatment. The coating material was then bonded to a commercial coated paper (OK Coat, available from New Oji Paper Co., Ltd.; weight: 127.9 g/$m^2$) in such an arrangement that the molten polyethylene resin layer was brought into contact with the coated paper. The laminate was then cooled and subjected to contact-bonding by means of a cooling roll. The PET film was then peeled off the laminate to prepare an ink jet recording material according to the present invention.

Comparative Example IV-1

A commercial ink jet recording highly glossy paper having a coating layer containing alumina, silica and polyvinyl alcohol incorporated therein as main components (GP-101, available from Canon Inc.) was used.

Comparative Example IV-2

A commercial ink jet recording highly glossy paper having a coating layer containing polyvinyl alcohol incorporated therein as a main component (HG-101, available from Canon Inc.) was used.

[Evaluation method]

The water resistance, gloss and water absorption of the ink jet recording paper sheets of Examples IV-1 to 5 and Comparative Examples IV-1 and IV-2 were evaluated by the methods described below. For the evaluation of gloss and ink absorption, recording was conducted on these ink jet recording paper sheets by means of a commercial ink jet printer (BJC600J, available from Canon Inc.). The gloss, ink absorption and print density on the solid area were then measured.

[Gloss (Luster) on the Printed Area]

For the evaluation of the gloss on the printed area, the printed area was visually observed at a horizontal angle of 20°. The gloss on the printed area was evaluated according to the following four-step criterion.

◎: Same level of luster as color photograph is felt;

○: Luster inferior to color photograph but still high is felt;

Δ: Luster as high as printed coated paper is felt; and

X: Luster as high as ordinary PPC is felt

[Ink Absorption]

For the evaluation of ink absorption, a woodfree paper was applied to the printed surface of the ink jet recording material every 5 seconds shortly after printing to see whether or not the ink was transferred to the woodfree paper. The time required until no ink is transferred to the high quality paper was determined. The ink absorption was then evaluated according to the following four-step criterion.

◎: Not more than 5 seconds;

○: 5 to 10 seconds;

Δ: 10 to 30 seconds; and

X: Not less than 30 seconds

The ink jet recording paper sheets which take 10 seconds or less until the ink is dried are excellent in ink absorption.

[Print Density]

The ink jet recording material was measured for print density on the black solid area by means of a Macbeth reflection densitometer (Macbeth, RD-920). The figure shown in the tables below is the mean of five measurements.

[Cracking of Coating Layer]

The surface of the ink-receiving layer was observed under an optical microscope (100× magnification). (◎: No cracking is observed on the surface of the ink-receiving layer; ○: The surface is partly cracked, the average of cracks being not more than 0.1 mm; Δ: The surface is partly cracked, the average of cracks being from 0.1 mm to 1 mm; X: The surface is totally cracked, the average of cracks being not less than 1 mm)

[Water Resistance]

A water droplet was dropped onto the ink jet recording sheet. After 30 minutes, the water droplet was wiped off the sheet. The sheet was then rubbed with a hand on the area impregnated with water. The water resistance was evaluated according to the following four-step criterion.

◎: No change is observed on the ink-receiving layer;

○: Ink-receiving layer is slightly peeled off;

Δ: Ink-receiving layer is partly peeled off; and

X: Ink-receiving layer is entirely peeled off

TABLE 4

| | Gloss on printed area | Ink absorption | Water resistance | Print resistance | Cracking of coat |
|---|---|---|---|---|---|
| Example IV-1 | ○ | ◎ | ◎ | 1.99 | ◎ |
| Example IV-2 | ◎ | ◎ | ◎ | 2.18 | ○ |
| Example IV-3 | ○ | ◎ | ◎ | 2.12 | ◎ |
| Example IV-4 | ○ | ◎ | ○ | 2.10 | ◎ |
| Example IV-5 | ○–◎ | ◎ | ◎ | 1.99 | ◎ |
| Comparative Example IV-1 | Δ | ◎ | ◎ | 1.45 | X |
| Comparative Example IV-2 | Δ | X | X | 1.94 | ◎ |

Table 4 shows that the ink jet recording sheets obtained according to the constitution of the present invention exhibit a good water resistance and ink absorption and still show a high gloss and a high print density even after receiving an ink.

The ink jet recording materials of the present invention have a high gloss as well as a high adaptability to ink jet recording (printing), high print density and moisture and water resistance.

EXAMPLE V-1

To a 15% aqueous solution of a mixture of 100 parts of an anionic colloidal silica having an average particle diameter of 65 nm (Snowtex YL, available from Nissan Chemical Industries, Ltd.) and 10 parts of PVA (PVA-117, available from Kuraray Co., Ltd.; polymerization degree: 1,700; percent saponification: 98.5%) were added 3 parts of a polyethylene polyamine dicyan diamide condensate (Neofix E-117, available from Nicca Chemical Co., Ltd.) as a cationic resin. The mixture was then subjected to dispersion. The dispersion was applied to the laminated surface of a commercial coated paper (OK Coat, available from New Oji Paper Co., Ltd.; 127.9 g/m$^2$) on which a polyethylene was laminated to a thickness of 15 $\mu$m by extrusion laminate method (hereinafter referred to as "laminated coated paper") by means of a mayor bar in an amount of 20 g/m$^2$, and then dried to prepare an ink jet recording sheet according to the present invention.

EXAMPLE V-2

To a 15% aqueous solution of a mixture of 100 parts of an anionic colloidal silica having an average particle diameter of 65 nm (Snowtex YL, available from Nissan Chemical Industries, Ltd.) and 10 parts of PVA (PVA-117, available from Kuraray Co., Ltd.) were added 5 parts of a polyethylene polyamine dicyan diamide condensate (Neofix E-117, available from Nicca Chemical Industries, Ltd.) as a cationic resin. The mixture was then subjected to dispersion. The dispersion was applied to a PET film (Lumirror T, available from Toray Industries, Ltd.; 75 $\mu$; surface roughness Ra: 0.02 $\mu$m) which was used as a forming material by means of a mayor bar in an amount of 15 g/m$^2$, and then dried.

Subsequently, a 15% aqueous solution of a mixture of 100 parts of an agglomeration of synthetic silica particles having a particle diameter of 4.5 gm (Fineseal X-45, available from Tokuyama Co., Ltd.), 40 parts of PVA (PVA-117, available from Kuraray Co., Ltd.) and 20 parts of a cationic resin (Sumiles Resin 1001, available from Sumitomo Chemical Co., Ltd.) was applied to the foregoing coating layer by means of a mayor bar in an amount of 5 g/m$^2$, and then dried.

Subsequently, an acrylic ester adhesive (A-02, available from Nippon Carbide Industries Co., Inc.) was applied to the surface of the foregoing laminated coated paper in an amount of 15 g/M$^2$, and then dried. Subsequently, the two coating materials were laminated in such an arrangement that the adhesive layer and the coating layer were opposed to each other. The laminate was then subjected to contact bonding at a linear pressure of 50 kg/cm by means of a calender. The PET film was then peeled off the laminate to prepare an ink jet recording sheet according to the present invention.

EXAMPLE V-3

A mixture of 60 parts of an acidic anionic colloidal silica having an average particle diameter of 45 nm (Snowtex ST-OL, available from Nissan Chemical Industries, Ltd.; pH: 3), 40 parts of a cationic alumina sol (AS-100 (amorphous), available from Nissan Chemical Industries, Ltd.; particle diameter: 10 nm×100 nm (as determined by electron microscope; shape: feathery; pH: 3.5) and 30 parts of a silicon-containing modified polyvinyl alcohol (R-2105, available from Kuraray Co., Ltd.) was prepared. The mixture was then applied to a PET film (Lumirror T, available from Toray Industries, Ltd.; 75 $\mu$; surface roughness Ra: 0.02 $\mu$m) which was used as a forming material by means of a mayor bar in an amount of 20 g/m$^2$, and then dried.

Subsequently, a molten polyethylene (Mitsubishi Polyethylene LD, available from Mitsubishi Chemical Industries, Ltd.) (melting temperature: 280 to 320° C.) was applied to the surface of a commercial coated paper (OK Coat, available from New Oji Paper Co., Ltd.; weight: 127.9 g/m$^2$) as a support by melt extrusion coating method (extrusion laminate method) to a thickness of 20 $\mu$m while being subjected to corona discharge treatment on one side thereof. The two coating materials were then bonded to each other in such an arrangement that the molten polyethylene resin layer and the foregoing ink-receiving layer were opposed to each other. The laminate was then cooled and subjected to contact-bonding by means of a cooling roll. The PET film was then peeled off the laminate to prepare an ink jet recording material according to the present invention.

The water resistance, preservability against high humidity, water absorption, colorability, etc. of the ink jet recording paper sheets thus obtained were evaluated by the methods described below. As the ink jet printer for evaluation there was used a commercial ink jet printer (BJC-600J, available from Canon Inc.).

[Water Resistance]

A water droplet was dropped onto the ink jet recording sheet. After 30 minutes, the water droplet was wiped off the sheet. The sheet was then rubbed with a hand on the area impregnated with water. The water resistance was evaluated according to the following four-step criterion.

◎: No change is observed on the ink-receiving layer;

○: Ink-receiving layer is slightly peeled off;

Δ: Ink-receiving layer is partly peeled off; and

X: Ink-receiving layer is entirely peeled off

[Preservability Against High Humidity]

The printed sheet was stored in a 40° C.-95%RH high humidity chamber for 7 days, and then evaluated for ink stain.

◎: No ink stain is observed;

○: Slight ink stain is observed;

Δ: Drastic ink stain is observed; and

X: Ink stain is observed on the entire surface

[Ink Absorption]

For the evaluation of ink absorption, a woodfree paper was applied to the printed surface of the ink jet recording material every 5 seconds shortly after printing to see whether or not the ink was transferred to the woodfree paper. The time required until no ink is transferred to the woodfree paper was determined. The ink absorption was then evaluated according to the following four-step criterion.

◎: Not more than 5 seconds;

○: 5 to 10 seconds;

Δ: 10 to 30 seconds; and

X: Not less than 30 seconds

The ink jet recording paper sheets which take 10 seconds or less until the ink is dried are excellent in ink absorption.

[Print Density]

The ink jet recording material was measured for print density on the black solid area by means of a Macbeth reflection densitometer (Macbeth, RD-920). The figure shown in the tables below is the mean of five measurements.

[Gloss (Luster) on the Printed Area]

For the evaluation of the gloss on the printed area, the printed area was visually observed at a horizontal angle of 20°. The gloss on the printed area was evaluated according to the following four-step criterion.

◎: Same level of luster as color photograph is felt;

○: Luster inferior to color photograph but still high is felt;

Δ: Luster as high as printed coated paper is felt; and

X: Luster as high as ordinary PPC is felt

[Colorability]

Black, cyan, magenta and yellow inks were dropped onto a white PET, and then dried. The color of print on the ink jet recording sheet was compared with the color obtained on the PET.

◎: Almost the same color is obtained;

Δ: Slight color deviation is observed; and

X: Drastic color deviation is observed

TABLE 5

| | Ink absorption | Water resistance | Preservability against high humidity |
|---|---|---|---|
| Example V-1 | ◎ | ◎ | ◎ |
| Example V-2 | ◎ | ◎ | ◎ |
| Example V-3 | ◎ | ◎ | ○ |
| | **Print density** | **Gloss on printed area** | **Colorability** |
| Example V-1 | 1.95 | ○ | ○ |
| Example V-2 | 1.97 | ◎ | ○ |
| Example V-3 | 2.21 | ◎ | ○ |

FIG. 5 shows that the ink jet recording sheets obtained according to the constitution of the present invention exhibit a good colorability, a high water resistance and a high ink absorption and still show a high gloss and a high print density even after receiving an ink.

The present embodiment is characterized by an ink jet recording sheet containing an ink-receiving layer formed on a sheet-like support such as paper and film wherein the ink-receiving layer consists of one or more layers and at least colloidal particles having an average particle diameter of not more than 300 nm and a cationic resin are incorporated in the same layer.

In particular, the colloidal particles are preferably anionic colloidal particles. If the colloidal particles are anionic, the pigment can be selected from a wide range of pigments, making it possible to obtain an ink jet recording sheet excellent in colorability, preservability against high humidity, ink absorption and gloss.

The ink jet recording sheet of the present invention has a high gloss as well as a high colorability, high preservability against high humidity, high adaptability to ink jet recording (printing), high print density and water resistance.

Incidentally, in the present invention, the recording layer is also called "ink receiving layer".

What is claimed is:

1. A process for producing a high gloss ink jet recording material comprising a support and a recording layer, comprising the steps of:

casting at least one composition comprising colloidal particles having an average particle diameter which is not more than 500 nm on a forming material having a high surface smoothness and drying said composition to form said recording layer;

placing said recording layer on said support; and peeling off the forming material from said recording layer.

2. A process for producing a high gloss ink jet recording material according to claim 1, wherein said recording layer is placed on said support having an interlayer comprising an adhesive.

3. A process for producing a high gloss ink jet recording material according to claim 1, wherein said recording layer has a plurality of layers.

4. A process for producing a high gloss ink jet recording material, according to claim 1, wherein the forming material having a high surface smoothness has a surface roughness Ra which is not more than 1 μm.

5. A process for producing a high gloss ink jet recording material according to claim 1, wherein said colloidal particles comprise at least one member selected from the group consisting of amorphous silica and colloidal silica.

6. A process for producing a high gloss ink jet recording material according to claim 2, wherein said adhesive is a pressure-sensitive adhesive.

7. A process for producing a high gloss ink jet recording material according to claim 2, wherein said interlayer comprising said adhesive is an interlayer selected from the group consisting of thermoplastic resin, thermosetting resin, composite polymer adhesive, rubber adhesive and hydrophilic natural high molecular adhesive.

8. A process for producing a high gloss ink jet recording material according to claim 1, wherein said recording layer is transferred to the support via an interlayer comprising an adhesive.

9. A process for producing a high gloss ink jet recording material according to claim 3, wherein at least one of said plurality of layers comprises colloidal particles.

10. A process for producing a high gloss ink jet recording material according to claim 3, wherein at least one of said plurality of layers comprises colloidal particles and a water-soluble resin.

11. A process for producing a high gloss ink jet recording material according to claim 3, wherein said recording layer comprises a lower layer and an upper layer wherein the lower layer is between the support and the upper layer;

said upper layer comprises a pigment in an amount of not less than 80% by weight based on the solid content of said upper layer; and said pigment comprises colloidal particles having an average particle diameter of not more than 200 nm in a proportion of not less than 85% by weight of said pigment.

12. A process for producing a high gloss ink jet recording material according to claim 3, wherein said recording layer comprises a plurality of layers comprising colloidal silica and an adhesive.

13. A process for producing a high gloss ink jet recording material according to claim 3, wherein said recording layer has at least a lower layer and an upper layer wherein the lower layer is between the support and the upper layer, wherein said upper layer comprises colloidal particles.

* * * * *